United States Patent
Li et al.

(10) Patent No.: US 9,942,064 B2
(45) Date of Patent: Apr. 10, 2018

(54) DATA PROCESSING METHOD AND APPARATUS

(71) Applicant: HUAWEI TECHNOLOGIES CO., LTD., Shenzhen, Guangdong (CN)

(72) Inventors: Zhijun Li, Beijing (CN); Zhiqiang Chen, Beijing (CN); Dajun Zang, Beijing (CN)

(73) Assignee: HUAWEI TECHNOLOGIES CO., LTD., Shenzhen (CH)

(*) Notice: Subject to any disclaimer, the term of this patent is extended or adjusted under 35 U.S.C. 154(b) by 164 days.

(21) Appl. No.: 15/062,479

(22) Filed: Mar. 7, 2016

(65) Prior Publication Data

US 2016/0191277 A1    Jun. 30, 2016

Related U.S. Application Data

(63) Continuation of application No. PCT/CN2014/084056, filed on Aug. 11, 2014.

(30) Foreign Application Priority Data

Sep. 6, 2013    (CN) .......................... 2013 1 0404838

(51) Int. Cl.
*H04L 25/14* (2006.01)
*G06F 17/00* (2006.01)
(Continued)

(52) U.S. Cl.
CPC .............. *H04L 25/14* (2013.01); *G06F 17/00* (2013.01); *H04L 1/0002* (2013.01);
(Continued)

(58) Field of Classification Search
CPC ......... H04L 25/03872; H04L 25/03866; H04L 25/14; H04L 1/002; H04L 1/0026; H04L 12/6418

See application file for complete search history.

(56) References Cited

U.S. PATENT DOCUMENTS

| | | | |
|---|---|---|---|
| 8,732,375 B1* | 5/2014 | Vijayaraghavan | .... G06F 13/385 710/305 |
| 8,949,493 B1* | 2/2015 | Wortman | .................. G06F 5/00 377/26 |

(Continued)

FOREIGN PATENT DOCUMENTS

| CN | 1679349 A | 10/2005 |
|---|---|---|
| CN | 102474481 A | 5/2012 |

(Continued)

OTHER PUBLICATIONS

IEEE Std 802.3-2012 Section Six, IEEE Standard for Ethernet, 2012. total 400 pages.

(Continued)

*Primary Examiner* — Gary Mui
(74) *Attorney, Agent, or Firm* — Huawei Technologies Co., Ltd.

(57) ABSTRACT

The present application discloses a data processing method and apparatus. The technical solutions of the present application include: coding received data; distributing the coded data to multiple PCS lanes; and performing self-synchronizing scramble separately for multiple data streams distributed to the multiple PCS lanes, where the multiple data streams are in a one-to-one correspondence with the multiple PCS lanes. The technical solutions provided by the present application may be used to reduce occupied logical resources during a data processing process at a physical layer.

4 Claims, 18 Drawing Sheets

(51) Int. Cl.
  *H04L 12/00* (2006.01)
  *H04L 12/64* (2006.01)
  *H04L 1/00* (2006.01)
  *H04L 25/03* (2006.01)

(52) U.S. Cl.
  CPC ............ *H04L 1/0026* (2013.01); *H04L 12/00* (2013.01); *H04L 12/6418* (2013.01); *H04L 25/03866* (2013.01); *H04L 25/03872* (2013.01)

(56) References Cited

U.S. PATENT DOCUMENTS

| | | | |
|---|---|---|---|
| 2001/0034729 A1* | 10/2001 | Azadet | H04L 29/06 |
| 2002/0196861 A1* | 12/2002 | Tzannes | H04L 5/14 375/261 |
| 2003/0217215 A1* | 11/2003 | Taborek, Sr. | H04L 12/40032 710/305 |
| 2005/0227715 A1 | 10/2005 | Riedl et al. | |
| 2006/0093146 A1* | 5/2006 | Ungerboeck | H04L 25/03866 380/268 |
| 2007/0165698 A1 | 7/2007 | Haque et al. | |
| 2007/0234172 A1* | 10/2007 | Chiabrera | H04L 1/0043 714/752 |
| 2008/0109707 A1 | 5/2008 | Dell et al. | |
| 2010/0202556 A1 | 8/2010 | Chiabrera | |
| 2011/0208954 A1 | 8/2011 | Barrett et al. | |
| 2012/0155486 A1 | 6/2012 | Ahn et al. | |
| 2015/0061906 A1* | 3/2015 | Luu | H03M 1/1205 341/122 |

FOREIGN PATENT DOCUMENTS

| | | |
|---|---|---|
| CN | 102577490 A | 7/2012 |
| EP | 2461623 A1 | 6/2012 |

OTHER PUBLICATIONS

Ieee standard et al: IEEE standard for information technology—specific requirements part3: carrier sense multiple access with collision detection (CSMA/CD) access method and physical layer specifications—section four; IEEE std 802.3-2008(Revision of IEEE std 802.3-2005),XP55290053A, Dec. 26, 2008. total 4 pages.

* cited by examiner

DATA PROCESSING METHOD AND APPARATUS

CROSS-REFERENCE TO RELATED APPLICATIONS

This application is a continuation of International Application No. PCT/CN2014/084056, filed on Aug. 11, 2014, which claims priority to Chinese Patent Application No. 201310404838.2, filed on Sep. 6, 2013, both of which are hereby incorporated by reference in their entireties.

TECHNICAL FIELD

The present invention relates to the field of communications technologies, and in particular, to a data processing method and apparatus.

BACKGROUND

As the Internet rapidly develops, a future Ethernet interface bandwidth may have two rates: 400GE (gigabit Ethernet, gigabit Ethernet) and 1TE (terabit Ethernet).

In the IEEE 802.3ba standard, a 40GE/100GE Ethernet PCS (Physical Coding Sublayer, physical coding sublayer) uses an implementation method of self-synchronizing scramble and descramble (Self Synchronizing Scramble and Descramble) at an aggregate level before multi-lane distribution. Synchronizing scramble and descramble may be self-synchronizing scramble/descramble on aggregate level (Self Synchronizing Scramble and Descramble on Aggregate Level, Scramble on AL). Referenced may be made to block distribution (block distribution) in the IEEE 802.3ba for the multi-lane distribution. In the existing 100GE standard, self-synchronizing scramble (which may be executed by a logic circuit for implementing self-synchronizing scramble) and self-synchronizing descramble (which may be executed by a logic circuit for implementing self-synchronizing descramble) occur before the multi-lane distribution, and therefore they are also referred to as the Scramble on AL.

A self-synchronizing scrambling method cannot perform effective pipelined processing because of a feedback characteristic of the method. In the 100GE standard, a high-performance parallel processing Scramble on AL solution requires that: when a working frequency is 312.5 MHz, 40 bytes of data can be processed at a time, and about 0.4 k LUT (Look Up Table, look up table) resources are needed. The LUT is one of main logic units in an FPGA (Field Programmable Gate Array, field programmable gate array) chip. Further, if a future 400GE standard is still implemented according to the high-performance parallel processing Scramble on AL solution, it is required that under a working frequency of 312.5 MHz, 160 bytes of data can be processed at a time, and about 10.8 k LUT resources are needed. From 100GE to 400GE, a bandwidth becomes four times the original, and occupied LUT resources are 20-30 times the original.

With appearance of concepts such as a Flexible Grid (flexible grid), a Flexible OTN (Flexible Optical Transmission Network, flexible optical transmission network), and a Flexible Bandwidth optical network (flexible bandwidth optical network), a related concept such as a flexible Ethernet characterized by that Ethernet interfaces are channelized and may be flexibly grouped also appears correspondingly. For example, lane resources, which originally belong to a fixed 400GE Ethernet interface completely, flexibly bear, in a sharing manner of flexible configuration and flexible grouping, flexible Ethernet interfaces which are grouped in various manners such as one 400GE Ethernet interface, one 300GE Ethernet interface+one 100GE Ethernet interface, two 200GE Ethernet interfaces, four 100GE Ethernet interfaces, eight 50GE Ethernet interfaces or sixteen 25GE Ethernet interfaces. During an implementation process of the flexible Ethernet, a MAC data stream processed by a MAC (Media Access Control, media access control) sublayer is decomposed into multiple sub MAC streams after a sub MAC stream distribution process, and each sub MAC stream separately performs self-synchronizing scramble and multi-lane distribution processing. In the IEEE 802.3ba 100GE standard, in implementation of a flexible Ethernet with a high interface bandwidth such as 400 Gbps or 1 Tbps, if the Scramble on AL solution similar to that in the 100GE standard is used, after sub MAC streams are distributed and before the sub MAC streams are distributed to multiple PCS lanes (PCS lanes), it is necessary to separately complete scramble processing of the various flexibly configured sub MAC streams, that is, Scramble on AL of Sub MAC Stream (self-synchronizing scramble on aggregate level of sub MAC stream).

As an Ethernet interface bandwidth rate is improved rapidly, in the Scramble on AL solution and the Scramble on AL of Sub MAC Stream solution, a data bandwidth processed by a logic circuit for implementing scramble and descramble increases, which results in a geometric growth in an aspect such as occupied logical resources. As a result, chip design requirements are improved. That is, costs in various aspects such as a chip area, power consumption, and timing convergence are correspondingly and significantly increased. Therefore, it is not conducive to implementation of an FPGA (Field Programmable Gate Array, field programmable gate array) or an ASIC (Application Specific Integrated Circuit, application specific integrated circuit) of a system.

SUMMARY

Embodiments of the present invention provide a data processing method and apparatus, which are used to reduce occupied logical resources during a data processing process at a physical layer.

According to a first aspect, a data processing method is provided, where the method includes:

coding received data; distributing the coded data to multiple physical coding sublayer PCS lanes; and performing self-synchronizing scramble separately for multiple data streams distributed to the multiple PCS lanes, where the multiple data streams are in a one-to-one correspondence with the multiple PCS lanes.

With reference to the first aspect, in a first possible implementation manner, the performing self-synchronizing scramble separately for multiple data streams distributed to the multiple PCS lanes includes: performing, by multiple scrambling modules, self-synchronizing scramble separately for the multiple data streams, where the multiple scrambling modules are in a one-to-one correspondence with the multiple PCS lanes.

With reference to the first possible implementation manner of the first aspect, in a second possible implementation manner, before the performing self-synchronizing scramble separately for multiple data streams distributed to the multiple PCS lanes, the method further includes: separately initializing values of multiple shift registers in the multiple scrambling modules, where the multiple scrambling modules are in a one-to-one correspondence with the multiple shift registers, and an absolute value of a correlation coefficient among the initialized values of the multiple shift registers is not greater than a set threshold.

With reference to the second possible implementation manner of the first aspect, in a third possible implementation manner, the separately initializing values of multiple shift registers in the multiple scrambling modules includes:

acquiring an N*M-bit PRBS sequence generated by a pseudo-random binary sequence PRBS generator:

dividing the N*M-bit PRBS sequence into N M-bit PRBS sequences; and separately assigning the N M-bit PRBS sequences to N shift registers initially, the N shift registers being the multiple shift registers, where a quantity of the multiple PCS lanes is N, and M is an order of a scramble generator polynomial.

According to a second aspect, a data processing method is provided, where the method includes:

performing self-synchronizing descramble separately for multiple received data streams of multiple physical coding sublayer PCS lanes, where the multiple data streams are in a one-to-one correspondence with the multiple PCS lanes;

performing multi-lane aggregation for multiple data streams that undergo the self-synchronizing descramble; and decoding the multi-lane aggregated data stream.

With reference to the second aspect, in a first possible implementation manner, the performing self-synchronizing descramble separately for multiple data streams includes: performing, by multiple descrambling modules, self-synchronizing descramble separately for the multiple data streams, where the multiple descrambling modules are in a one-to-one correspondence with the multiple PCS lanes.

According to a third aspect, a transmitter is provided, and includes: a physical coding sublayer PCS, where the PCS includes: a coding module, a multi-lane distribution module, and multiple scrambling modules, where:

the coding module is configured to code received data;

the multi-lane distribution module is configured to distribute data coded by the coding module to multiple PCS lanes; and the multiple scrambling modules are configured to perform self-synchronizing scramble separately for multiple data streams that are distributed by the multi-lane distribution module to the multiple PCS lanes, where the multiple data streams are in a one-to-one correspondence with the multiple PCS lanes, and the multiple scrambling modules are in a one-to-one correspondence with the multiple PCS lanes.

With reference to the third aspect, in a first possible implementation manner, the PCS further includes:

an initialization module, configured to separately initialize values of multiple shift registers in the multiple scrambling modules, where the multiple scrambling modules are in a one-to-one correspondence with the multiple shift registers, and an absolute value of a correlation coefficient among the initialized values of the multiple shift registers is not greater than a set threshold.

With reference to the first possible implementation manner of the third aspect, in a second possible implementation manner, the initialization module is specifically configured to: acquire an N*M-bit PRBS sequence generated by a pseudo-random binary sequence PRBS generator, divide the N*M-bit PRBS sequence into N M-bit PRBS sequences, and separately assign the N M-bit PRBS sequences to N shift registers initially, the N shift registers being the multiple shift registers, where a quantity of the multiple PCS lanes is N, and M is an order of a scramble generator polynomial.

According to a fourth aspect, a receiver is provided, and includes: a physical coding sublayer PCS, where the PCS includes: a decoding module, a multi-lane aggregation module, and a descrambling module, where:

the descrambling module is configured to perform self-synchronizing descramble separately for multiple received data streams of multiple PCS lanes, where the multiple data streams are in a one-to-one correspondence with the multiple PCS lanes:

the multi-lane aggregation module is configured to perform multi-lane aggregation for multiple data streams that undergo the self-synchronizing descramble performed by the descrambling module; and the decoding module is configured to decode data streams that are aggregated by the multi-lane aggregation module.

With reference to the fourth aspect, in a first possible implementation manner, the descrambling module is multiple descrambling modules, and the multiple descrambling modules are in a one-to-one correspondence with the multiple PCS lanes; and each descrambling module of the multiple descrambling modules is configured to perform self-synchronizing descramble for a received data stream of a corresponding PCS lane.

According to a fifth aspect, an apparatus is provided, and the apparatus may be one of the following apparatuses:

a PHY, where the PHY may be implemented by using an FPGA or an ASIC; the PHY may be a part in an NIC, and the NIC may be a line card or a PIC; and the PHY may include an MII for interfacing to a MAC:

a PHY chip, where the PHY chip may include multiple PHYs, and the PHY chip may be implemented by using an FPGA or an ASIC;

a system chip, where the system chip may include multiple MACs and multiple PHYs, and the system chip may be implemented by using an FPGA or an ASIC; and a multiport Ethernet device, where the multiport Ethernet device may be an Ethernet hub, an Ethernet router, or an Ethernet switch; the multiport Ethernet device includes multiple ports, each port may include a system chip, and the system chip may include MACs and PHYs; the multiport Ethernet device may further integrate multiple MACs into one MAC chip (MAC chip), and integrate multiple PHYs into one PHY chip; and the multiport Ethernet device may also integrate multiple MACs and multiple PHYs into one system chip.

The apparatus can execute the method provided by the first aspect or any one of the possible implementation manners of the first aspect.

According to a sixth aspect, an apparatus is provided, and the apparatus may be one of the following apparatuses:

a PHY, where the PHY may be implemented by using an FPGA or an ASIC; the PHY may be a part in an NIC, and the NIC may be a line card or a PIC; and the PHY may include an MII for interfacing to a MAC;

a PHY chip, where the PHY chip may include multiple PHYs, and the PHY chip may be implemented by using an FPGA or an ASIC;

a system chip, where the system chip may include multiple MACs and multiple PHYs, and the system chip may be implemented by using an FPGA or an ASIC; and a multiport Ethernet device, where the multiport Ethernet device may be an Ethernet hub, an Ethernet router, or an Ethernet switch; the multiport Ethernet device includes multiple ports, each port may include a system chip, and the system chip may include MACs and PHYs; the multiport Ethernet device may further integrate multiple MACs into one MAC chip, and integrate multiple PHYs into one PHY chip; and the multiport Ethernet device may also integrate multiple MACs and multiple PHYs into one system chip.

The apparatus can execute the method provided by the second aspect or any one of the possible implementation manners of the second aspect.

In the foregoing embodiments of the present invention, a self-synchronizing scrambling operation is arranged to be performed after a multi-lane distribution operation. That is, multiple data streams distributed to multiple PCS lanes are scrambled separately, and a corresponding descrambling operation is performed before multi-lane aggregation. Performing a scrambling operation for one bit involves one or more bits before the bit. The greater number of bits in a shift register in a scrambler indicates a more complex scrambling operation. Complexity of the scrambling operation grows with an increase in a quantity of the bits in the shift register in the scrambler, and a growth rate of the complexity of the scrambling operation exceeds a growth rate of a quantity of the bits in the shift register. For example, a self-synchronizing scramble generator polynomial may be: $G(X)=X^{58}+X^{39}+1$. According to a generator polynomial algorithm, a scrambling result of 1-bit data is related to the bit data, the $39^{th}$ bit before the bit data, and the $58^{th}$ bit before the bit data. Therefore, when a shift register is a scrambler with a bit width of N-bit data, logic implementation complexity of the shift register increases non-linearly with an increase in N. It is assumed that a bit width of the shift register in the scrambler becomes Y times the original, logical resources required by the shift register in the scrambler are Z times the original, and Z>Y. For example, Z is equal to Y+1 or Y+2. Under a clock frequency, after data that undergoes physical layer coding is distributed to N PCS lanes, a bandwidth of the data that undergoes the physical layer coding is N times that of data of each PCS lane. Correspondingly, a bit width of data, after distribution, of each PCS lane is one Nth of that of data before distribution. Therefore, logical resources occupied for performing self-synchronizing scramble or descramble separately for N data streams after the multi-lane distribution are less than logical resources occupied for performing self-synchronizing scramble or descramble for data before distribution. Compared with the prior art, the technical solutions provided by the embodiments of the present invention help reduce costs in aspects such as a chip area, power consumption, and timing convergence, and help lower implementation complexity.

BRIEF DESCRIPTION OF DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

FIG. 2A' is a schematic flowchart of a data processing method according to an embodiment of the present invention:

FIG. 4A' is a schematic structural diagram of a receiver according to an embodiment of the present invention:

DESCRIPTION OF EMBODIMENTS

To make the objectives, technical solutions, and advantages of the present invention clearer, the following further describes the present invention in detail with reference to the accompanying drawings. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

In order to ease a fast increase in costs in aspects such as a chip area, power consumption, and timing convergence, which exists in the existing technical solutions and is caused by a geometric growth of occupied logical resources, the embodiments of the present invention provide a solution of self-synchronizing scramble and descramble based on each PCS lane of multiple PCS lanes. For convenience of description, in the embodiments of the present invention, the solution is referred to as self-synchronizing scramble/descramble on virtual lane (Self Synchronizing Scramble and Descramble on Virtual Lane, Scramble on VL).

Figure 1:
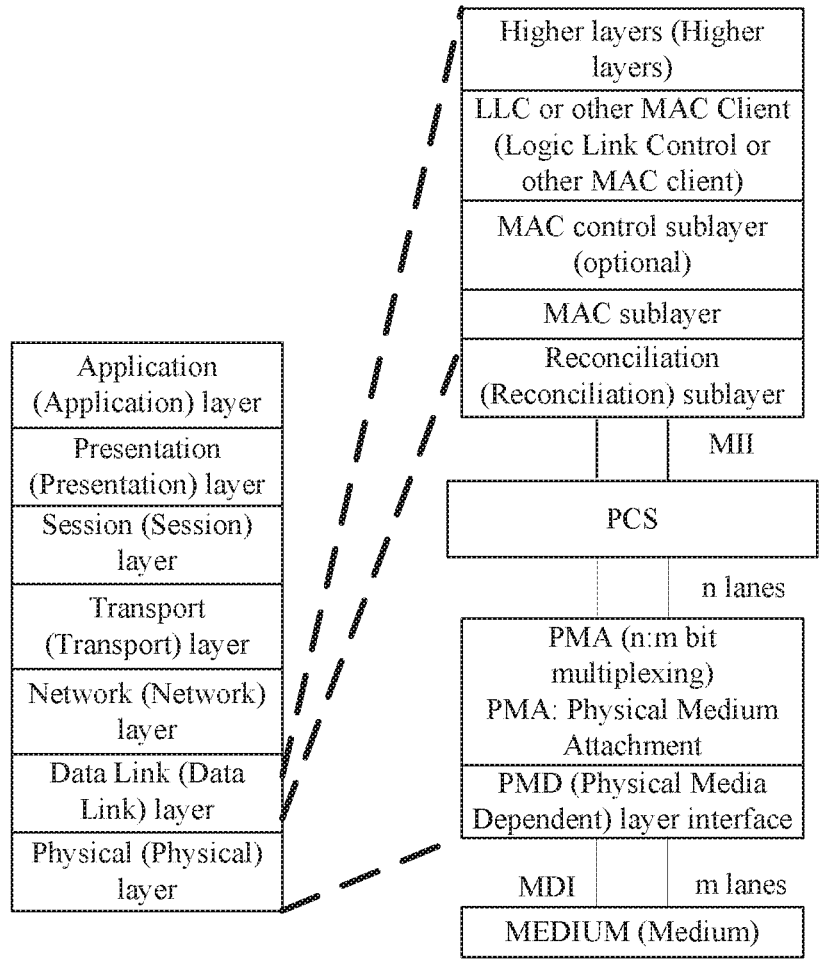
FIG. 1 is a schematic diagram of a network seven-layer protocol architecture in the prior art.

The embodiments of the present invention are mainly implemented at a physical (Physical) layer in a network seven-layer protocol architecture shown in FIG. 1. As shown in FIG. 1, the physical layer may include an RS sublayer (Reconciliation Sublayer, reconciliation sublayer), a PCS sublayer, a PMA (Physical Medium Attachment, physical medium attachment) sublayer, a PMD (Physical Media Dependent, physical media dependent) sublayer, and so on. The embodiments of the present invention are mainly implemented at the PCS sublayer. For a high-speed Ethernet (such as a 100GE or beyond-100GE high-speed Ethernet), at the PCS sublayer of the physical layer, processing operations of self-synchronizing scramble and descramble are arranged to be performed separately on PCS lanes obtained after multi-lane distribution. That is, a scrambling module and a descrambling module are disposed separately for each PCS lane to perform self-synchronizing scramble and descramble. The scrambling module may be a logic circuit for implementing a self-synchronizing scramble function. The descrambling module may be a logic circuit for implementing a self-synchronizing descramble function. Specifically, at a transmit end, the scrambling module disposed on each PCS lane performs self-synchronizing scramble. At a receive end, the descrambling module disposed on each PCS lane performs self-synchronizing descramble.

Performing a scrambling operation for one bit involves one or more bits before the bit. The greater number of bits in a shift register in a scrambler indicates a more complex scrambling operation. Complexity of the scrambling operation grows with an increase in a quantity of the bits in the shift register in the scrambler, and a growth rate of the complexity of the scrambling operation exceeds a growth rate of a quantity of the bits in the shift register. For example, a self-synchronizing scramble generator polynomial may be: $G(X)=X^{58}+X^{39}+1$. According to a generator polynomial algorithm, a scrambling result of 1-bit data is related to the bit data, the $39^{th}$ bit before the bit data, and the $58^{th}$ bit before the bit data. Therefore, when a shift register is a scrambler with a bit width of N-bit data logic implementation complexity of the shift register increases non-linearly with an increase in N. It is assumed that a bit width of the shift register in the scrambler becomes Y times the original, logical resources required by the shift register in the scrambler are Z times the original, and Z>Y. For example, Z is equal to Y+1 or Y+2. Under a clock frequency, after data that undergoes physical layer coding is distributed to N PCS lanes, a bandwidth of the data that undergoes the physical layer coding is N times that of data of each PCS lane. Correspondingly, a bit width of data, after distribution, of each PCS lane is one Nth of that of data before distribution. Therefore, logical resources occupied for performing self-synchronizing scramble or descramble separately for N data streams after the multi-lane distribution are less than logical resources occupied for performing self-synchronizing scramble or descramble for data streams before distribution. Compared with the prior art, the technical solutions provided by the embodiments of the present invention help reduce costs in aspects such as a chip area, power consumption, and timing convergence, and help lower implementation complexity.

Further, the embodiments of the present invention further provide other technical solutions, to improve link direct current balance (DC balance) performance and bit transition (bit transition) performance of a physical lane at an Ethernet electrical interface, and improve bit error rate (Bit Error Rate, BER) performance of a system and working reliability and stability of a CDR (Clock Data Recover, clock data recovery) circuit at a receive end. In the embodiments of the present invention, before a scrambling module on each PCS lane performs scramble processing for a data stream of a corresponding PCS lane, the scrambling module may be initialized first, so as to perform initialization and assignment for a shift register in the scrambling module. An initial value of the scrambling module on each PCS lane may meet the following requirements: an initial-value state sequence of the shift register in the scrambling module is highly randomized, and an initial-value state sequence correlation of the scrambling module on each PCS lane is small. The correlation is generally represented by using a correlation coefficient r, where r is in a range of [−1, 1]. A smaller absolute value of r indicates a smaller correlation. In the embodiments, an allowable maximum value of r may be given, and the absolute value of the correlation coefficient r among values of the shift registers is not greater than the set maximum value. Preferably, the maximum value of the absolute value of r may be set to 0.75.

Further, in order to improve an effect of error propagation on a MAC CRC32 (CRC: Cyclic Redundancy Check, cyclic redundancy check) error detection capability, and improve system MTTFPA (Mean Time to False Packet Acceptance, mean time to false packet acceptance, that is, a mean time that an error packet is recognized as a correct and effective packet and is received) performance. In the embodiments of the present invention, it may further be that: an FCS (Frame Check Sequence, frame check sequence) generated by CRC8 or CRC16 check coding is added to a MAC footer; or an FEC (Forward Error Correction, forward error correction) check sequence is added separately to a data stream of each PCS lane at the physical layer; or both an FCS check sequence generated by CRC8 or CRC16 check coding is added to a MAC footer and an FEC check sequence is added separately to a data stream of each PCS lane at the physical layer.

Specific implementation of the Scramble on VL solution of the embodiments of the present invention is described in detail below with reference to two specific embodiments. First, it should be noted that, without a specific statement, in the following content: a PCS refers to a circuit capable of executing a PCS layer function, an RS refers to a circuit capable of executing an RS layer function, a MAC refers to a circuit capable of executing a MAC layer function, and control information and data are transmitted between the RS and the PCS by using an MII (Media Independence Interface, media independence interface).

Embodiment 1

Figure 1A:
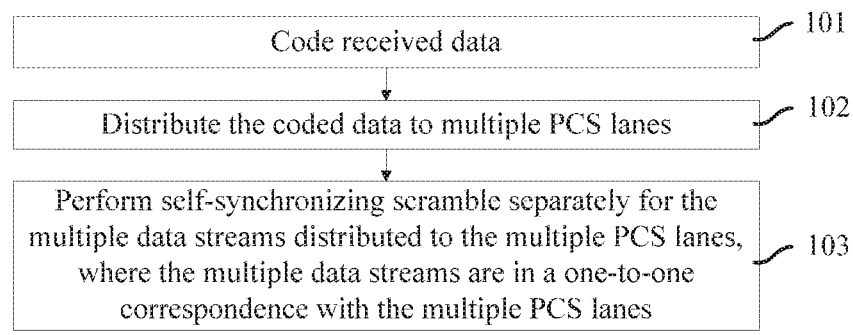
FIG. 1A is a schematic flowchart of a data processing method according to an embodiment of the present invention.

FIG. 1A is a schematic flowchart of a data processing method according to an embodiment of the present invention. Referring to FIG. 1A, the method includes:

101: Code received data.

102: Distribute the coded data to multiple physical coding sublayer PCS lanes.

103: Perform self-synchronizing scramble separately for the multiple data streams distributed to the multiple PCS lanes, where the multiple data streams are in a one-to-one correspondence with the multiple PCS lanes.

Figure 2A:
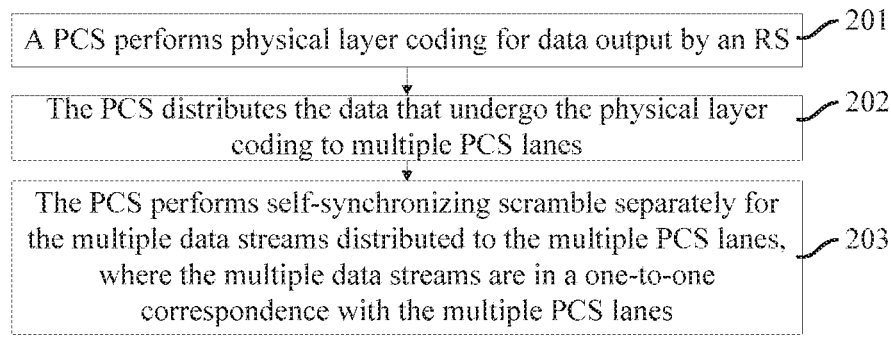
FIG. 2A is a schematic flowchart of a processing method according to an embodiment of the present invention.
Figure 2A:
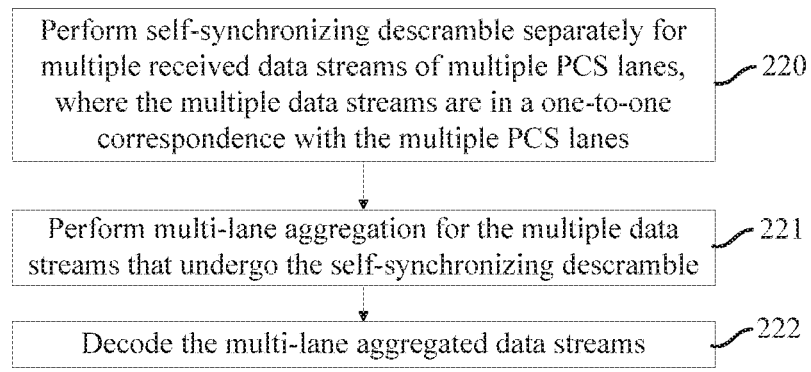

For example, the method shown in FIG. 1A may specifically be the method shown in FIG. 2A. Specifically, 101, 102 and 103 in FIG. 1A may be 201, 202 and 203 in FIG. 2A respectively.

For example, the method shown in FIG. 1A may be executed by a PHY, a PHY chip (PHY chip), a system chip (system chip) or a multiport Ethernet device (multi-port Ethernet device).

The PHY may be implemented by using an FPGA or an ASIC. The PHY may be a part in a network interface card (Network Interface Card, NIC), and the NIC may be a line card (Line Card) or a PIC (Physical Interface Card, physical interface card). The PHY may include a Media-Independent Interface (media-independent interface, MII) for interfacing to (for interfacing to) a MAC.

The PHY chip may include multiple PHYs. The PHY chip may be implemented by using an FPGA or an ASIC.

The system chip may include multiple MACs and multiple PHYs, and the system chip may be implemented by using an FPGA or an ASIC.

The multiport Ethernet device may be an Ethernet hub, an Ethernet router, or an Ethernet switch. The multiport Ethernet device includes multiple ports, each port may include a system chip, and the system chip may include MACs and PHYs. The multiport Ethernet device may further integrate multiple MACs into one MAC chip (MAC chip), and integrate multiple PHYs into one PHY chip. The multiport Ethernet device may also integrate multiple MACs and multiple PHYs into one system chip.

FIG. 2A is a schematic flowchart of a data processing method according to an embodiment of the present invention. Referring to FIG. 2A, the method includes:

201: A PCS performs physical layer coding for data output by an RS.

202: The PCS distributes the data that undergo the physical layer coding to multiple PCS lanes.

203: The PCS performs self-synchronizing scramble separately for multiple data streams distributed to the multiple PCS lanes, where the multiple data streams are in a one-to-one correspondence with the multiple PCS lanes.

Optionally, in the method shown in FIG. 2A, that the PCS performs self-synchronizing scramble separately for the multiple data streams distributed to the multiple PCS lanes includes: multiple scrambling modules performs self-synchronizing scramble separately for the multiple data streams, where the PCS includes the multiple scrambling modules, and the multiple scrambling modules are in a one-to-one correspondence with the multiple PCS lanes.

Optionally, in the foregoing technical method, before the PCS performs self-synchronizing scramble separately for multiple data streams distributed to the multiple PCS lanes, the method further includes: separately initializing values of multiple shift registers in the multiple scrambling modules, where the multiple scrambling modules are in a one-to-one correspondence with the multiple shift registers, and an absolute value of a correlation coefficient among the initialized values of the multiple shift registers is not greater than a set threshold.

Optionally, in the foregoing technical method, the separately initializing values of multiple shift registers in the multiple scrambling modules includes: acquiring an N*M-bit PRBS sequence generated by a PRBS (Pseudo-Random Binary Sequence, pseudo-random binary sequence) generator; dividing the N*M-bit PRBS sequence into N M-bit PRBS sequences; and separately assigning the N M-bit PRBS sequences to N shift registers initially, where N is a quantity of the PCS lanes, and M is an order of a scramble generator polynomial.

FIG. 2A' is a schematic flowchart of a data processing method according to an embodiment of the present invention. Referring to FIG. 2A', the method includes:

220: Perform self-synchronizing descramble separately for multiple received data streams of multiple physical coding sublayer PCS lanes, where the multiple data streams are in a one-to-one correspondence with the multiple PCS lanes.

221: Perform multi-lane aggregation for the multiple data streams that undergo the self-synchronizing descramble.

222: Decode the multi-lane aggregated data stream.

Figure 2B:
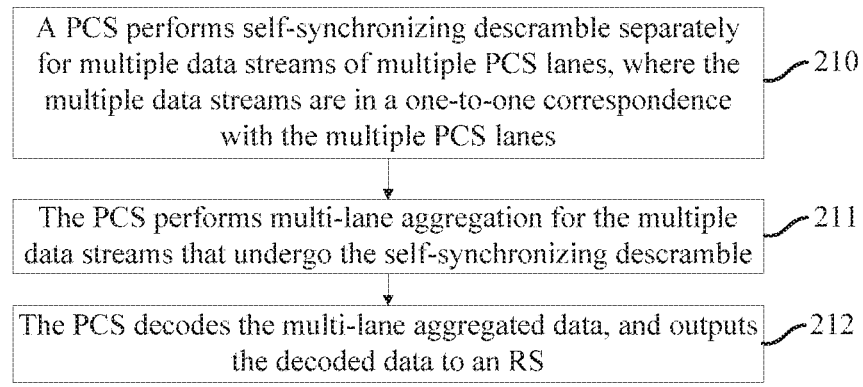
FIG. 2B is a schematic flowchart of a processing method according to an embodiment of the present invention.

For example, the method shown in FIG. 2A' may specifically be a method shown in FIG. 2B. Specifically, 220, 221 and 222 in FIG. 2A' may be 210, 211 and 212 in FIG. 2B respectively.

For example, the method shown in FIG. 2A' may be executed by a PHY, a PHY chip, a system chip or a multiport Ethernet device.

The PHY may be implemented by using an FPGA or an ASIC. The PHY may be a part in a network interface card, and the NIC may be a line card or a PIC. The PHY may include an MII for interfacing to a MAC.

The PHY chip may include multiple PHYs. The PHY chip may be implemented by using an FPGA or an ASIC.

The system chip may include multiple MACs and multiple PHYs; and the system chip may be implemented by using an FPGA or an ASIC.

The multiport Ethernet device may be an Ethernet hub, an Ethernet router, or an Ethernet switch. The multiport Ethernet device includes multiple ports, each port may include a system chip, and the system chip may include MACs and PHYs. The multiport Ethernet device may further integrate multiple MACs into one MAC chip, and integrate multiple PHYs into one PHY chip. The multiport Ethernet device may also integrate multiple MACs and multiple PHYs into one system chip.

FIG. 2B is a schematic flowchart of a data processing method according to another embodiment of the present invention. Referring to FIG. 2B, the method includes:

210: A PCS performs self-synchronizing descramble separately for multiple data streams of multiple PCS lanes, where the multiple data streams are in a one-to-one correspondence with the multiple PCS lanes.

211: The PCS performs multi-lane aggregation for the multiple data streams that undergo the self-synchronizing descramble.

212: The PCS decodes the multi-lane aggregated data, and outputs the decoded data to an RS.

Optionally, in the solution provided by FIG. 2B, that the PCS performs self-synchronizing descramble separately for multiple data streams includes: multiple descrambling modules performs self-synchronizing descramble separately for the multiple data streams, where the PCS includes the multiple descrambling modules, and the multiple descrambling modules are in a one-to-one correspondence with the multiple PCS lanes.

The method shown in FIG. 2A may be applied to physical layer data processing of a beyond-100GE Ethernet. This embodiment of the present invention further provides a specific implementation process of the Scramble on VL solution in a physical layer data processing process of a beyond-100GE Ethernet.

Figure 3A:
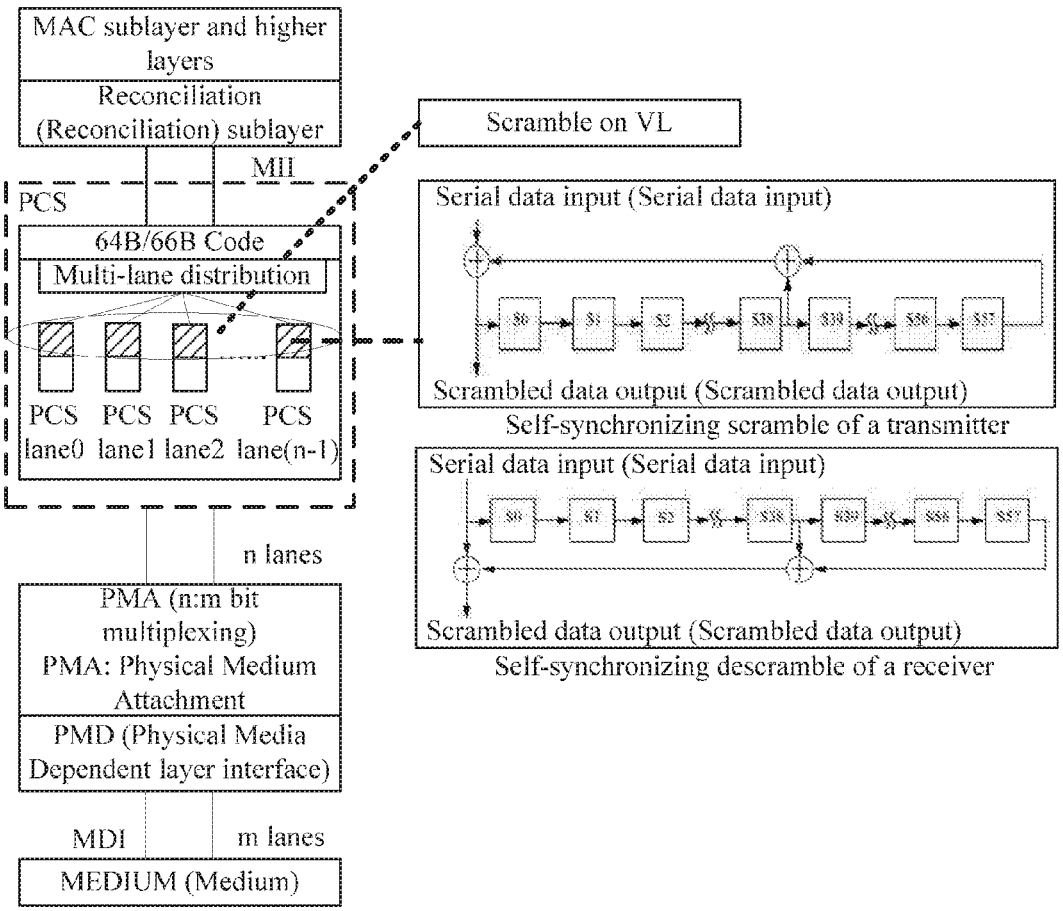
FIG. 3A is a block diagram of a Scramble on VL solution of a high-speed Ethernet according to an embodiment of the present invention.

For the beyond-100GE high-speed Ethernet, such as a 400GE high-speed Ethernet or a 1TE high-speed Ethernet, a block diagram of an organization structure based on the Scramble on VL solution provided by this embodiment of the present invention may be shown in FIG. 3A.

Figure 3B:
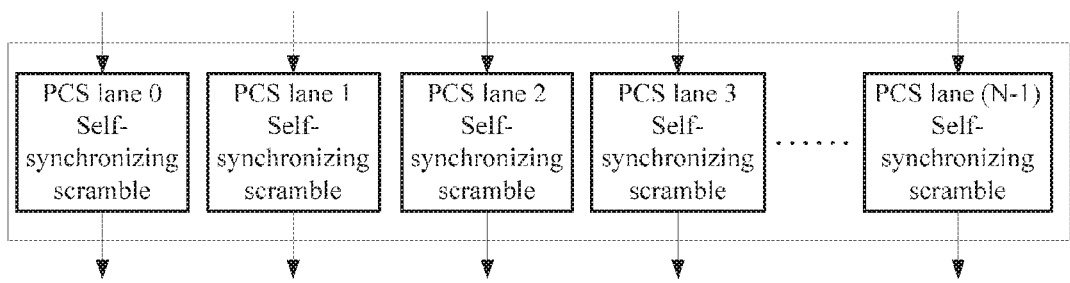
FIG. 3B is a schematic diagram of performing scramble separately for multiple PCS lanes at a high-speed Ethernet transmit end according to an embodiment of the present invention.
Figure 3C:
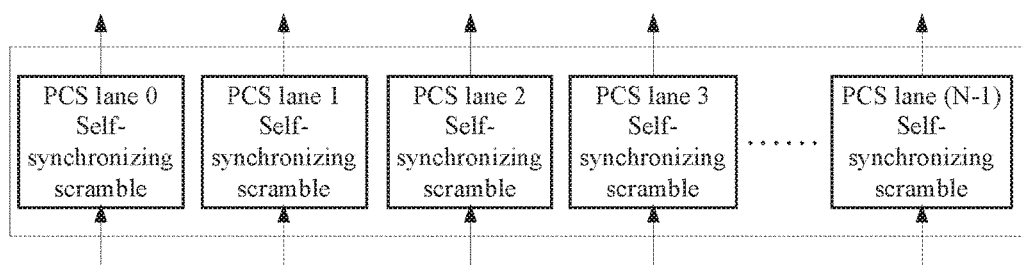
FIG. 3C is a schematic diagram of performing descramble separately for multiple PCS lanes at a high-speed Ethernet receive end according to an embodiment of the present invention.

The organization structure shown in FIG. 3A may be implemented in the following manner: a scrambling module and a descrambling module between a 64B/66B coding module and a multi-lane distribution module, which are at a PCS sublayer, in the 802.3ba standard are canceled, and the scrambling module and the descrambling module are arranged after the multi-lane distribution module. During specific implementation, as shown in FIG. 3B and FIG. 3C, an independent scrambling module and an independent descrambling module may be placed on each PCS lane obtained by multi-lane distribution, and each scrambling module and each descrambling module perform self-synchronizing scramble and descramble processing only for a data stream on this PCS lane. 64B/66B coding may also be replaced with another coding manner (such as 256B/257B coding).

A physical layer scrambling process at a transmit end and a physical layer descrambling process at a receive end that are based on the foregoing protocol architecture are described below. It should be noted that, a protocol layer involved in the scrambling process and the descrambling process described below mainly includes a physical layer, and reference may be made to the 802.3ba standard for implementation of processing processes of other protocol layers.

Figure 3D:
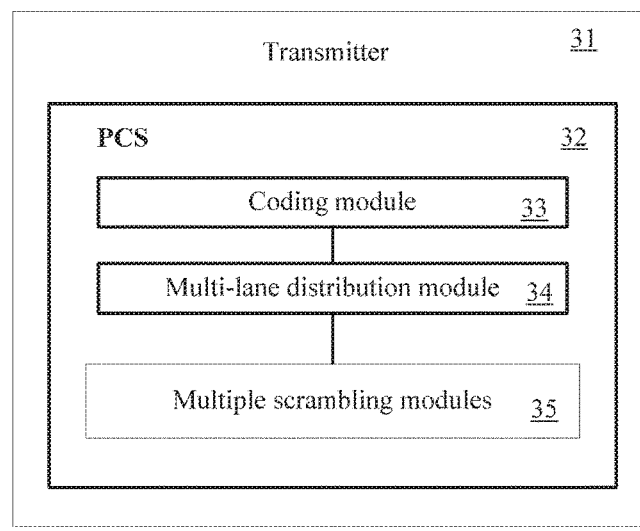
FIG. 3D is a schematic structural diagram of a transmitter according to an embodiment of the present invention.

FIG. 3D is a schematic structural diagram of a transmitter according to an embodiment of the present invention. Referring to FIG. 3D, a transmitter 31 includes a PCS 32. The PCS 32 includes a coding module 33, a multi-lane distribution module 34 and multiple scrambling modules 35.

For example, the coding module 33 may be a coder, the multi-lane distribution module 34 may be a distributor, and the multiple scrambling modules 35 may be multiple scramblers.

For example, the transmitter 31 may be configured to execute the method shown in FIG. 1A.

Figure 4A:
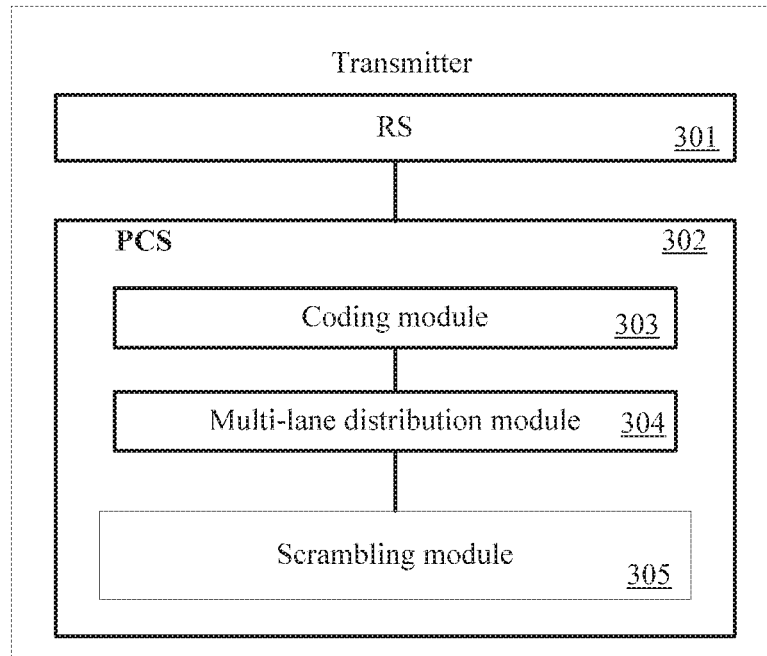
FIG. 4A is a schematic structural diagram of a transmitter according to an embodiment of the present invention.
Figure 4A:
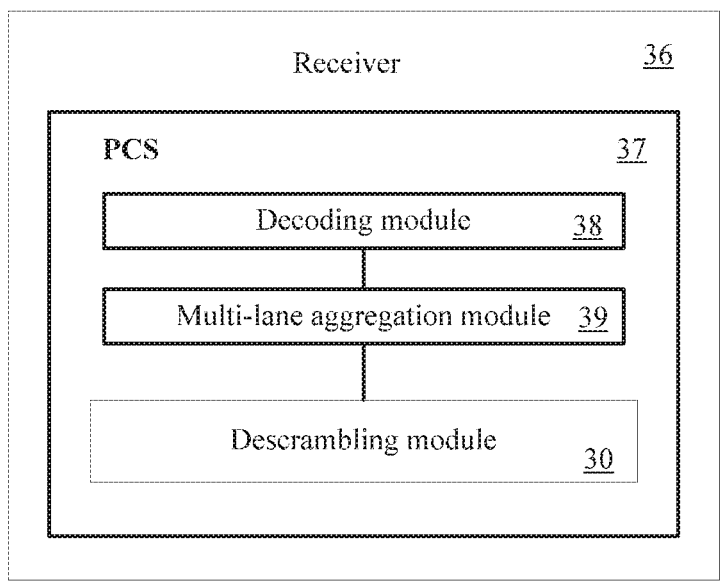

For example, the transmitter 31 may specifically be a transmitter shown in FIG. 4A. The coding module 33, the multi-lane distribution module 34 and the multiple scrambling modules 35 in FIG. 3D may be a coding module 303, a multi-lane distribution module 304 and a scrambling module 305 in FIG. 4A respectively.

Figure 5A:
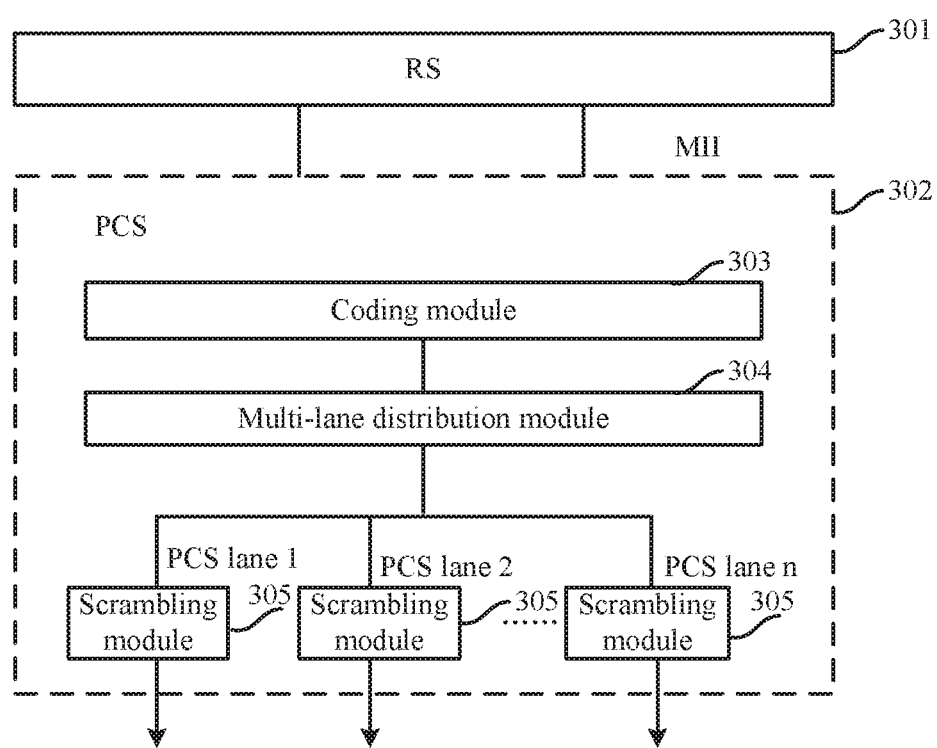
FIG. 5A is a schematic structural diagram of a transmitter according to an embodiment of the present invention.
Figure 7A:
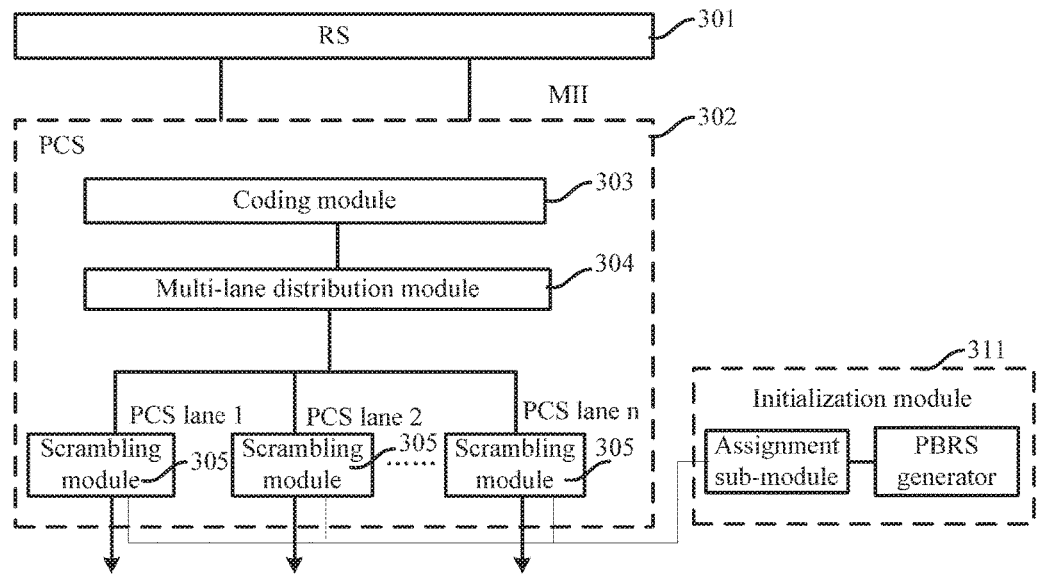
FIG. 7A is a schematic diagram of adding an initialization module based on FIG. 5A.

FIG. 4A, FIG. 5A and FIG. 7A separately are schematic structural diagrams of a transmitter according to an embodiment of the present invention. The transmitter in FIG. 4A, FIG. 5A and FIG. 7A may be configured to execute the method shown in FIG. 2A. Referring to FIG. 4A, FIG. 5A and FIG. 7A, the transmitter includes: an RS 301 and a PCS 302. The PCS 302 includes: a coding module 303, a multi-lane distribution module 304, and scrambling modules 305. The coding module 303 is configured to perform physical layer coding for data output by the RS 301; the multi-lane distribution module 304 is configured to distribute data coded by the coding module 303 to multiple PCS lanes; and the scrambling modules 305 are configured to perform self-synchronizing scramble separately for multiple data streams distributed by the multi-lane distribution module 304 to the multiple PCS lanes, where the multiple data streams are in a one-to-one correspondence with the multiple PCS lanes.

Optionally, the transmitter may further include an initialization module 311, configured to separately initialize values of multiple shift registers in multiple scrambling modules, where the multiple scrambling modules are in a one-to-one correspondence with the multiple shift registers, an absolute value of a correlation coefficient among the initialized values of the multiple shift registers is not greater than a set threshold, and the scrambling module contains multiple scrambling modules.

Optionally, in the foregoing technical solution, the initialization module 311 is specifically configured to: acquire an N*M-bit PRBS sequence generated by a PRBS generator; divide the N*M-bit PRBS sequence into N M-bit PRBS sequences; and separately assign the N M-bit PRBS sequences to N shift registers initially, where N is a quantity of the PCS lanes, and M is a shift register width.

FIG. 4A' is a schematic structural diagram of a receiver according to an embodiment of the present invention. Referring to FIG. 4A', a receiver 36 includes a PCS 37. The PCS 37 includes a decoding module 38, a multi-lane aggregation module 39, and a descrambling module 30.

For example, the decoding module 38 may be a decoder, the multi-lane aggregation module 39 may be an aggregator, and the descrambling module 30 may be a descrambler.

For example, the receiver 36 may be configured to execute the method shown in FIG. 2A'.

Figure 4B:
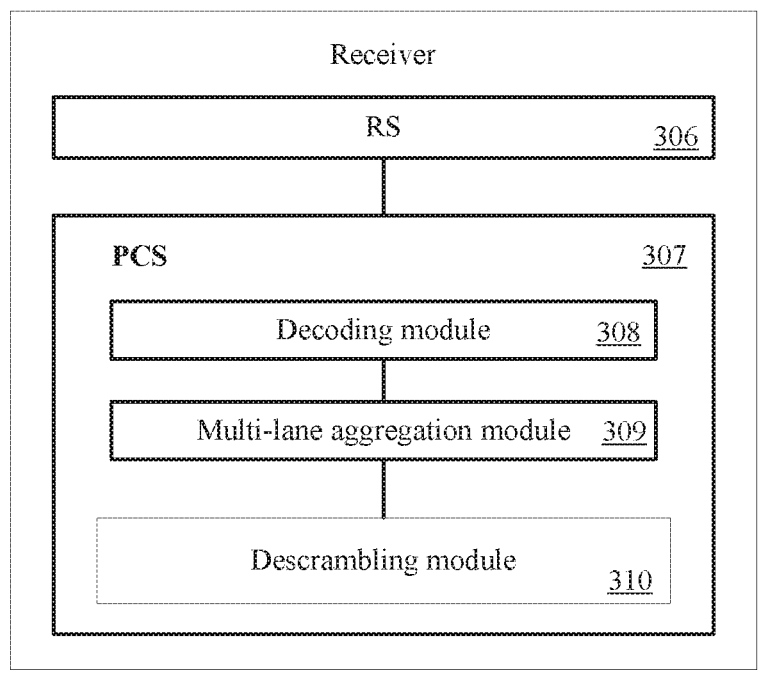
FIG. 4B is a schematic structural diagram of a receiver according to an embodiment of the present invention.

For example, the receiver 36 may specifically be a receiver shown in FIG. 4B. The decoding module 38, the multi-lane aggregation module 39 and the descrambling module 30 in FIG. 4A' may be a decoding module 308, a multi-lane aggregation module 309, and a descrambling module 310 in FIG. 4B respectively.

Figure 5B:
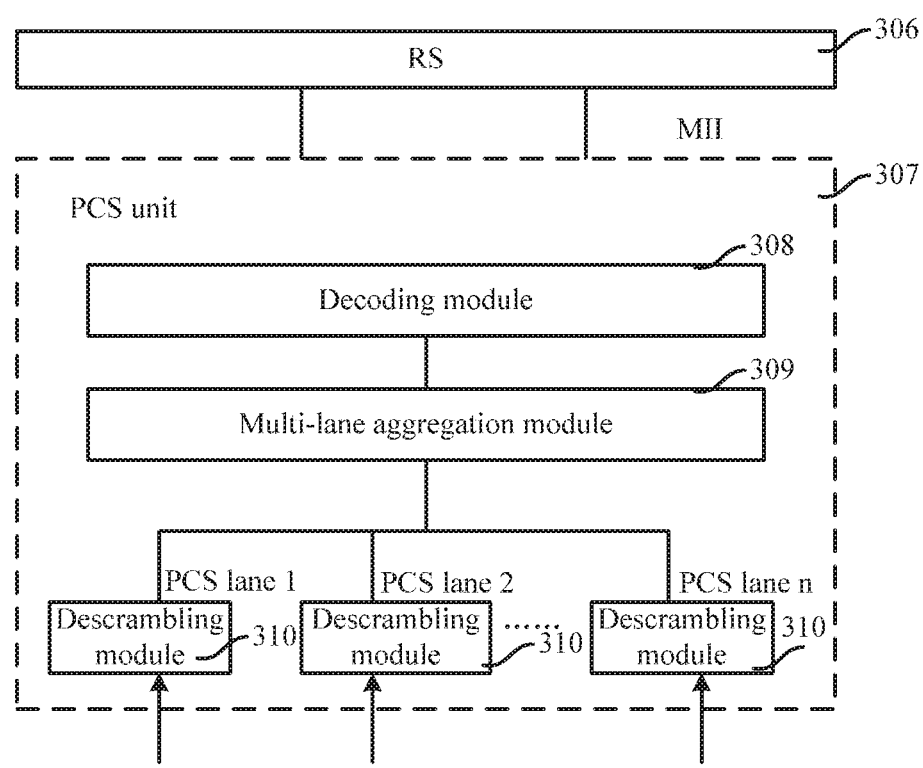
FIG. 5B is a schematic structural diagram of a receiver according to an embodiment of the present invention.

FIG. 4B and FIG. 5B separately are schematic structural diagrams of a receiver according to an embodiment of the present invention. The receiver in FIG. 4B and FIG. 5B may be configured to execute the method shown in FIG. 2B. Referring to FIG. 4B and FIG. 5B, the receiver includes an RS 306 and a PCS 307. The PCS 307 includes: a decoding module 308, a multi-lane aggregation module 309, and a descrambling module 310. The descrambling modules 310 are configured to perform self-synchronizing descramble separately for multiple data streams of multiple PCS lanes, where the multiple data streams are in a one-to-one correspondence with the multiple PCS lanes; the multi-lane aggregation module 309 is configured to perform multi-lane aggregation for multiple data streams that undergo the self-synchronizing descramble performed by the descrambling module 310; and the decoding module 308 is configured to decode data aggregated by the multi-lane aggregation module 309, and output the decoded data to the RS 306.

In the foregoing transmitter, the coding module in the PCS is mainly configured to implement a 64B/66B coding function at a PCS sublayer; the multi-lane distribution module in the PCS is mainly configured to implement a function of distributing data blocks to multiple PCS lanes; and the scrambling module in the PCS mainly implements self-synchronizing scramble.

In the receiver, the decoding module in the PCS is mainly configured to implement a 64B/66B decoding function at the PCS sublayer; the aggregation module in the PCS is mainly configured to implement a function of aggregating (that is, de-distributing) the multiple PCS lanes; and the descrambling module in the PCS mainly implements self-synchronizing descramble.

The units and/or functional modules may be implemented by using a logic circuit.

Based on the architecture shown in FIG. 3A or FIG. 5A, a physical layer scrambling process of the transmitter may include:

A coding module in the PCS receives, by using an MII, data output by an RS. The data may be a packet stream, for example, a packet stream sent by an NP (Network Processor, network processor), an ASIC, or a TM (Traffic Management, traffic management) chip. The packet stream may be an Ethernet frame (Ethernet Frame). The Ethernet frame may include an Internet Protocol datagram (IP datagram). The coding module performs 64B/66B coding, where the coded data may be a data block stream, for example, may be a 66-bit data block stream. The coding module outputs the coded data to a multi-lane distribution module. The multi-lane distribution module distributes the data coded by the coding module to multiple PCS lanes (PCS lanes). A quantity of the PCS lanes is set according to a system solution. A scrambling module corresponding to each PCS lane performs self-synchronizing scramble for data of this PCS lane.

Further, after the self-synchronizing scramble, an AM (alignment marker, Alignment Marker) may be periodically added to each PCS lane separately. The AM may be used to cancel, at a receive end, data skew skew among the PCS lanes. In addition, the AM may be used to implement a PCS lane reordering function.

The 64B/66B coding and adding an AM belong to operations at the PCS sublayer. After that, data processed by the PCS reaches PMA for bit multiplexing (that is, serial coding), and then is sent to a transmission medium via PMD to be transmitted. Reference may be made to FIG. 3A for implementation of the self-synchronizing scramble, and a used self-synchronizing scramble generator polynomial may be:

$$G(X)=X^{58}+X^{39}+1 \quad (1).$$

Based on the architecture in FIG. 3A or FIG. 5B, a physical layer descrambling process of the receiver may include:

After receiving data from PMD, PMA performs bit demultiplexing processing, to generate data streams of N PCS lanes; a descrambling module disposed on each PCS lane performs self-synchronizing descramble for a data stream on this PCS lane; a multi-lane aggregation module performs aggregation (de-distribution) processing for all descrambled PCS lanes; and a decoding module decodes data processed by the multi-lane aggregation module. After that, data processed by the PCS is output to an RS via an Mil interface to be processed. Reference may be made to FIG. 3A for implementation of the self-synchronizing descramble, where a descrambling process is based on the self-synchronizing scramble generator polynomial shown in Formula (1).

It can be seen from the foregoing process that, in the embodiment of the present invention, self-synchronizing scramble and descramble processing processes are moved from before a multi-lane distribution processing operation to after the multi-lane distribution processing operation, and self-synchronizing scramble and descramble are performed separately for each PCS lane obtained by multi-lane distribution. In this way, because a bandwidth of each PCS lane is narrow, logic circuit design costs for scramble and descramble are reduced compared with those in the prior art, and therefore, costs in aspects such as a chip area, power consumption, and timing convergence can be reduced.

It should be considered that, a structure of implementing "MLD+Bit MUX (that is, after performing multi-lane distribution at a PCS sublayer for multiple PCS lanes, performing bit multiplexing at a PMA sublayer)" processing adversely affects system link performance. In some cases, it is possible that fixed content data such as IDLE (idle) data, which has a strong correlation, may be sent on all physical links. For example, when a system is just reset, the IDLE data is sent to perform system initialization, so as to implement data recovery, synchronization, locking, and so on. However, the "MLD+Bit MUX" operation may have a significant adverse effect on direct current balance (DC balance) performance and bit transition (bit transition) performance of the physical links.

In order to improve the link direct current balance (DC balance) performance and bit transition (bit transition) performance of a physical lane at an Ethernet electrical interface in the Scramble on VL solution, and finally improve bit error rate performance of a system and working reliability and stability of a CDR circuit at a receive end, in this embodiment of the present invention, the scrambling module on each PCS lane at a transmit end may be further initialized separately, that is, a value of a shift register in the scrambling module is initialized, to ensure that the system works stably and reliably.

When the shift register in the scrambling module on each PCS lane is initialized, an initial value of the shift register in the scrambling module on each PCS lane may meet the following requirements: an initial-value state sequence of the shift register in the scrambling module is highly randomized, and an initial-value state sequence correlation of the scrambling module on each PCS lane is as small as possible.

Initialization may be performed in the following manner: a PRBS (Pseudo-Random Binary Sequence, pseudo-random binary sequence) generator generates an N*M-bit PRBS sequence, the N*M-bit PRBS sequence is divided into N M-bit PRBS sequences, and the N M-bit PRBS sequences are separately assigned to N shift registers initially. N is a quantity of PCS lanes, N is an integer not less than 2, and M is a shift register width, which is an order of a scramble generator polynomial (order of polynomial), or referred to as an order of polynomial (degree of polynomial), where a value of M is usually 58 (as shown in Formula 1), and may also be 3, 7, or the like.

Specific implementation manners of initialization solutions are described below by assuming that M=58.

Initialization Solution 1: PRBS Software Initialization Solution

In the initialization solution 1, a PRBS generator in a software form (such as a PRBS generator of bundled software or third party software of a logic circuit module) is used. The PRBS generator generates an N*58-bit PRBS sequence required by N PCS lanes to serve as an initial-value state sequence. Then, a functional module (such as a software and hardware interface module) for delivering the initial-value state sequence sends the N*58-bit PRBS sequence to a functional module for processing the initial-value state sequence. The functional module for processing the initial-value state sequence cuts the N*58-bit PRBS sequence into N 58-bit PRBS sequences, and separately delivers the N 58-bit PRBS sequences to scrambling modules of the N PCS lanes for initialization and assignment, where a scrambling module on each PCS lane uses one 58-bit PRBS sequence to perform initialization and assignment for a shift register in the scrambling module.

An alternative manner of the initialization solution 1 is that: the N*58-bit PRBS sequence required by the N PCS lanes is acquired by using a man-machine interface to serve as an initial-value state sequence. For example, an administrator may input an N*58-bit PRBS sequence required by the N PCS lanes to the PRBS generator by using a man-machine interface. Other processing operations are the same as those described above.

Initialization Solution 2: Serial PRBS Hardware Initialization Solution

Figure 6A:
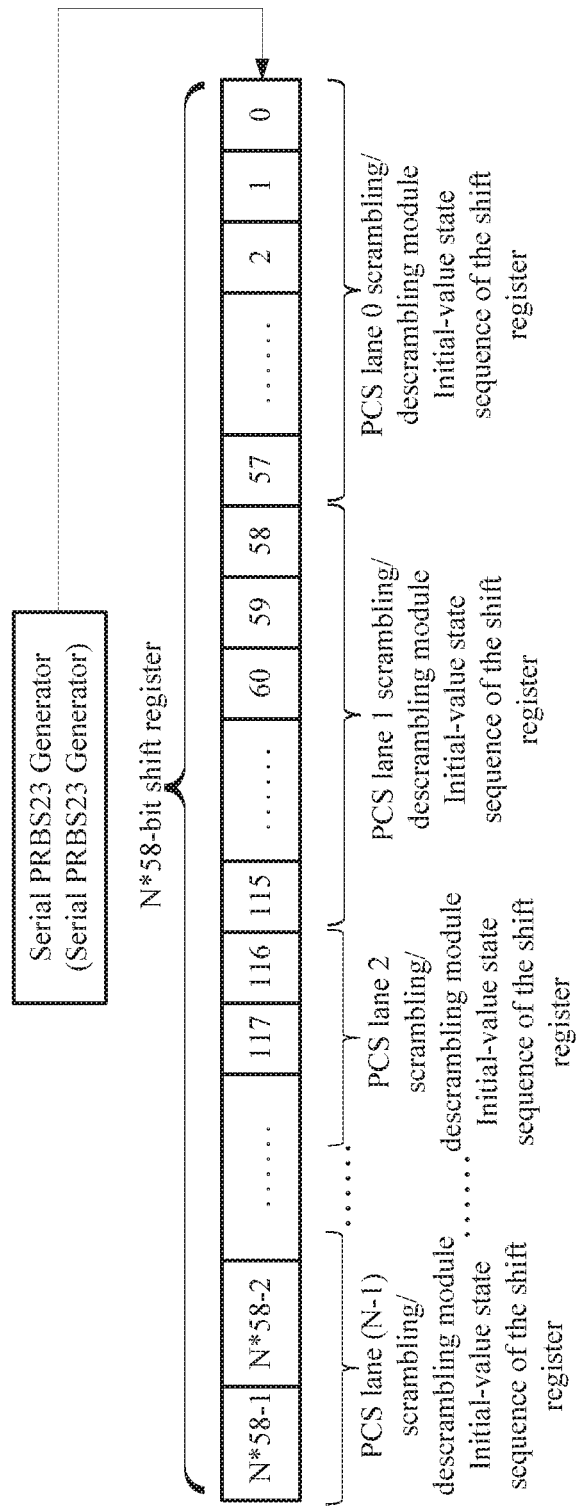
FIG. 6A is a schematic diagram of a serial PRBS hardware initialization solution according to an embodiment of the present invention.

In the initialization solution 2, a serial PRBS generator is first implemented in hardware chip logic, and an N*58-bit PRBS sequence required by N PCS lanes is generated, in a manner of combining a logic circuit of the serial PRBS generator with an N*58-bit serial shift register, to serve as an initial-value state sequence. After bit transition occurs in the top bit of the serial shift register, a PRBS sequence stored in the N*58-bit serial shift register is cut into N 58-bit PRBS sequences, which are separately assigned to scrambling modules on the N PCS lanes for initialization and assignment, where a scrambling module on each PCS lane uses one 58-bit PRBS sequence to perform initialization and assignment for a shift register in the scrambling module. FIG. 6A shows the serial PRBS hardware initialization solution. At least N*58 clock cycles are needed to complete an initialization operation by using the initialization solution 2. When an area of chip logic is scarce and the chip logic is insensitive to an initialization delay, use of the initialization solution 2 may be considered.

Initialization Solution 3: Parallel PRBS Hardware Initialization Solution

Figure 6B:
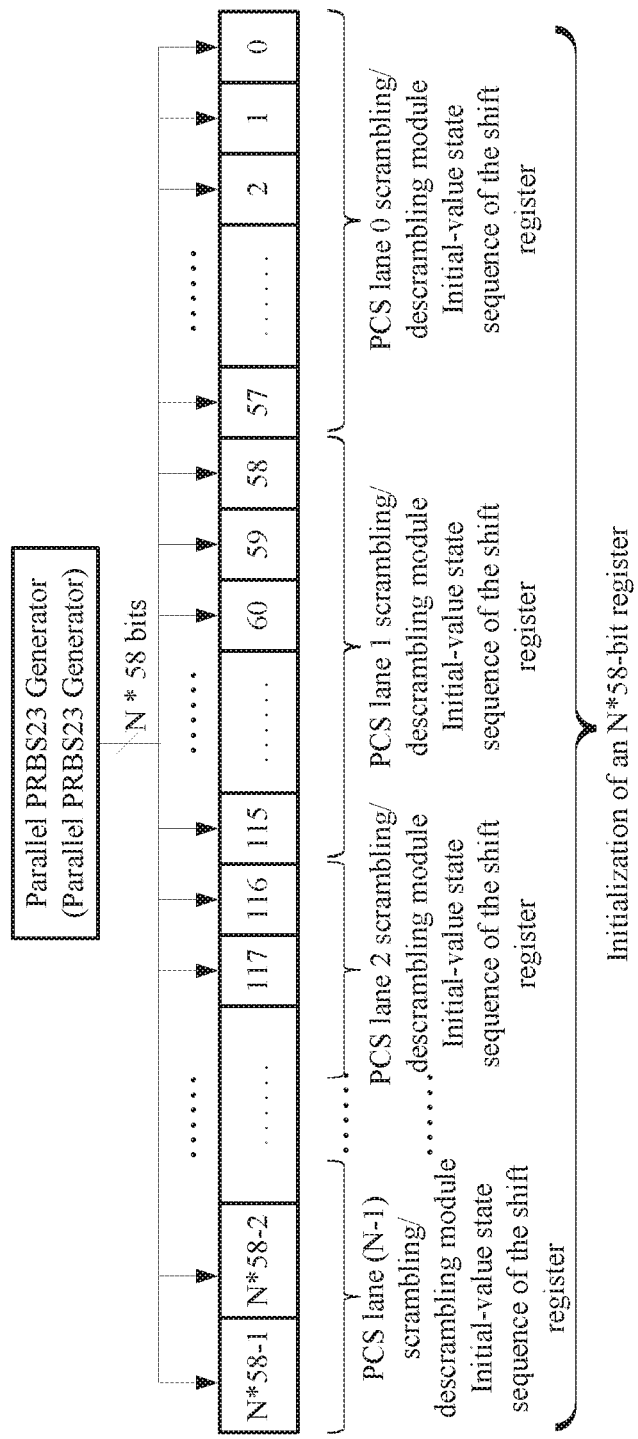
FIG. 6B is a schematic diagram of a parallel PRBS hardware initialization solution according to an embodiment of the present invention.

In the initialization solution 3, a parallel PRBS generator is first implemented in hardware chip logic, and a logic circuit of the parallel PRBS generator directly generates an N*58-bit PRBS sequence to serve as an initial-value state sequence. Then, the generated N*58-bit PRBS sequence is cut into N 58-bit initial-value state sequences, which are directly assigned to scrambling modules on the N PCS lanes for initialization and assignment. FIG. 6B shows the parallel PRBS hardware initialization solution. Only one clock cycle is needed to complete an initialization operation by using the initialization solution 3. When area resources of chip logic are sufficient and the chip logic is sensitive to an initialization delay, use of the initialization solution 3 may be considered.

In order to implement the foregoing initialization solutions, an initialization module may be disposed based on FIG. 5A. As shown in FIG. 7A, the initialization module may include a PRBS generator and an assignment sub-module, where if the initialization solution 1 is used, the PRBS generator is a PRBS generator in a software form, and a PRBS sequence generating manner and a manner in which the assignment sub-module assigns a shift register in each scrambling module are the same as the description of the initialization solution 1;

if the initialization solution 2 is used, the PRBS generator is a serial PRBS generator in a logic circuit form, and a PRBS sequence generating manner and a manner in which the assignment sub-module assigns a shift register in each scrambling module are the same as the description of the initialization solution 2; and if the initialization solution 3 is used, the PRBS generator is a parallel PRBS generator in a logic circuit form, and a PRBS sequence generating manner and a manner in which the assignment sub-module assigns a shift register in each scrambling module are the same as the description of the initialization solution 3.

Considering that a low-level PRBS sequence (such as a PRBS11) has a poor effect on link performance improvement due to a short cycle, optionally, in the foregoing three initialization solutions for scrambling module initialization, a high-order PRBS sequence such as a PRBS23 and a PRBS31 may be used as much as possible.

Certainly, if the BER performance of a system and the receive end CDR circuit performance are acceptable, the foregoing three initialization solutions may not even be used, and the shift registers of the scrambling modules are directly initialized to any value (such as all zero).

In the solution in which an initialization processing operation for the value of the shift register in the scrambling module is added, a physical layer scrambling process at a transmit end and a physical layer descrambling process at a receive end are basically consistent with the foregoing processes, and an only difference is that it is necessary to initialize the value of the shift register in the scrambling module according to the initialization solutions described above when the scrambling module is disposed.

It can be seen from the foregoing solutions of adding scrambling module initialization that: in one aspect, in this embodiment of the present invention, self-synchronizing scramble and descramble processing processes are moved from before a multi-lane distribution processing operation to after the multi-lane distribution processing operation, and self-synchronizing scramble is performed separately for each PCS lane obtained by multi-lane distribution; in this way, because a bandwidth of each PCS lane is small, logic circuit designs for the scramble and descramble are reduced compared with those in the prior art, and therefore, costs in aspects such as a chip area, power consumption, and timing convergence can be reduced; and in another aspect, a scrambling module is initialized, so that link direct current balance (DC balance) performance and bit transition (bit transition) performance of a physical lane at an Ethernet electrical interface in the Scramble on VL solution can be improved, and finally bit error rate performance of a system and working reliability and stability of a CDR circuit at a receive end are improved.

Considering that the self-synchronizing scrambling operation has a characteristic of error propagation, a 1-bit error may be propagated to a 3-bit error. The Scramble on VL solution provided by this embodiment of the present invention further complicates a positional relationship among error bits after the error propagation. In addition, it is easier for a propagated error to cross a data packet, so that system MTTFPA performance of the Scramble on VL solution provided by this embodiment of the present invention is, based on a non-conservative estimate, about in a same magnitude as life-span of the universe, but lower than performance of an existing Scramble on AL solution.

In order to improve an effect of the error propagation on a MAC CRC32 error detection capability, and improve the system MTTFPA performance, in this embodiment of the present invention, the following several optimization solutions of adding a check sequence may be used:

Optimization Solution 1: Add an FEC (Forward Error Correction, Forward Error Correction) Check Sequence after the Self-Synchronizing Scramble At the PCS sublayer, after a scrambling module performs the self-synchronizing scramble, FEC coding/decoding forward error correction processing is performed separately on each PCS lane, that is, the FEC check sequence is added; and before a descrambling module performs self-synchronizing descramble, FEC check is performed for data on each PCS lane. A higher gain of the added FEC check sequence indicates greater improvement of the BER performance of a system, so that better MTTFPA performance may be provided. For example, if an FEC (2112, 2080) fire code solution in the IEEE 802.3ba standard is used, the system MTTFPA performance may be close to reaching a performance lower limit of the existing Scramble on AL solution.

Figure 8A:
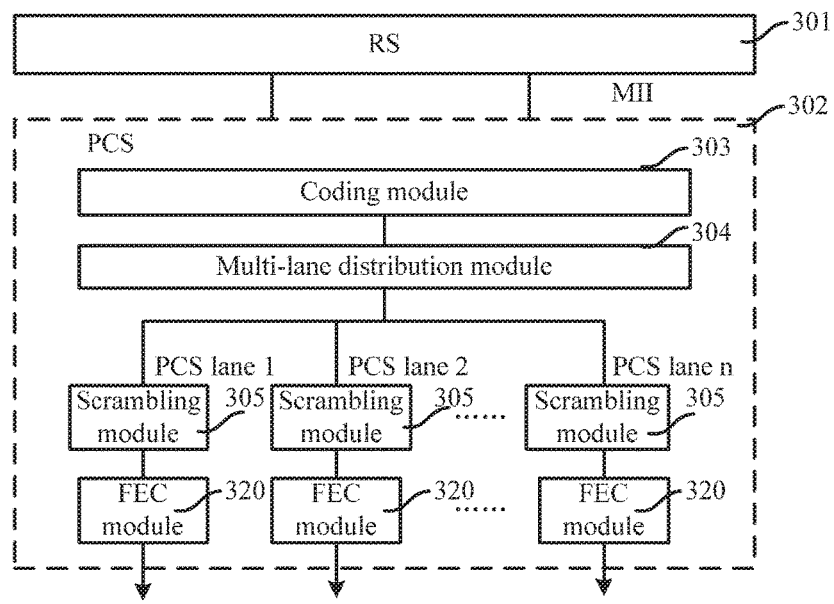
FIG. 8A is a schematic diagram of adding an FEC module based on FIG. 5A.
Figure 8B:
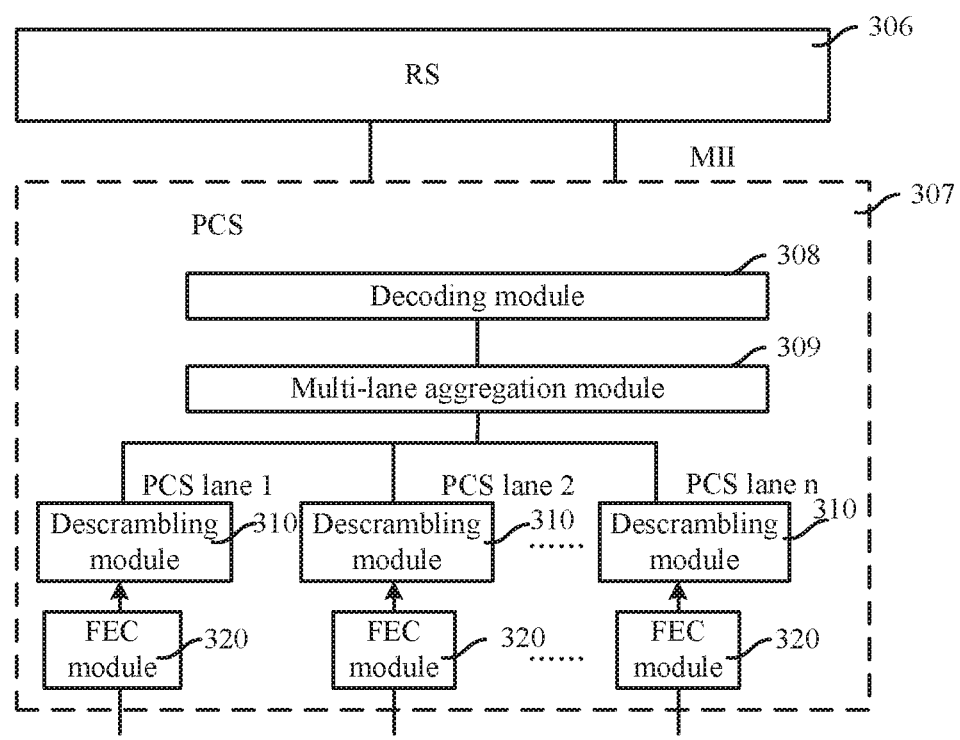
FIG. 8B is a schematic diagram of adding an FEC module based on FIG. 5B.

During specific implementation, an FEC module 320 may be disposed on each PCS lane. At the transmitter, the FEC module 320 is configured to implement the foregoing processing operation of adding an FEC check sequence. At the receiver, the foregoing FEC module 320 is configured to implement operations of FEC error correction and error detection, and then a descrambling operation is performed. FIG. 8A shows a schematic structural diagram of adding FEC modules 320 based on FIG. 5A. FIG. 8B shows a schematic diagram of adding FEC modules 320 based on FIG. 5B. Similarly, the initialization module 311 may also be added based on FIG. 8A.

Optimization solution 2: add a CRC module between the RS and the PCS. The CRC module may add an FCS generated by CRC8 or CRC16 check coding after a CRC32 frame check sequence FCS (Frame Check Sequence, frame check sequence) of a data link layer MAC frame output by the RS.

Figure 9A:
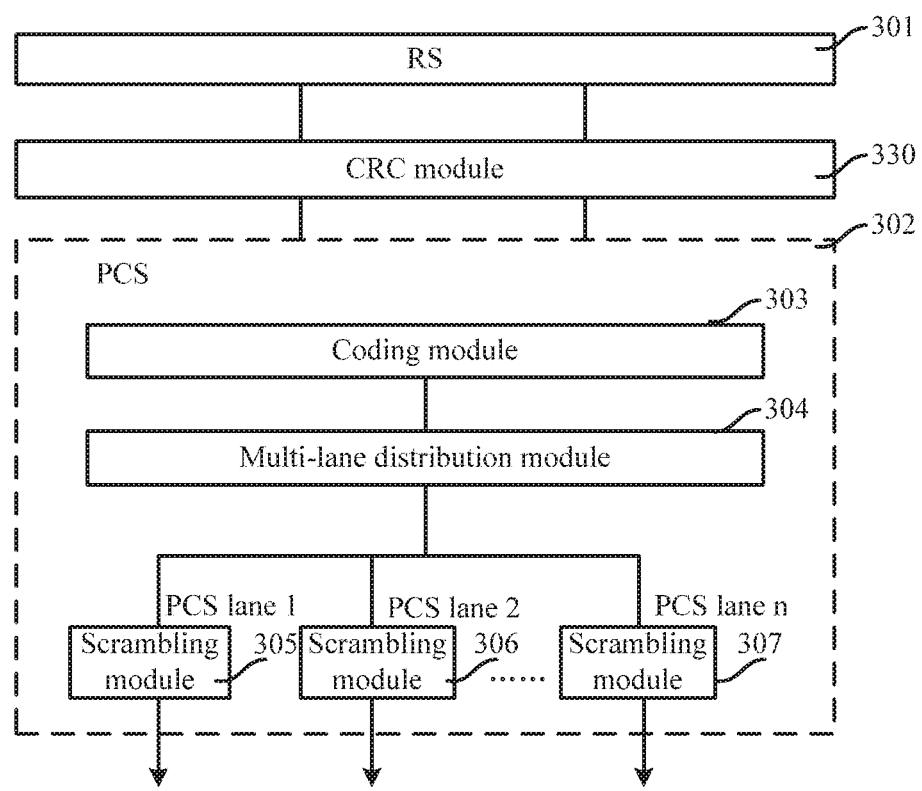
FIG. 9A is a schematic diagram of adding a CRC module based on FIG. 5A.
Figure 9B:
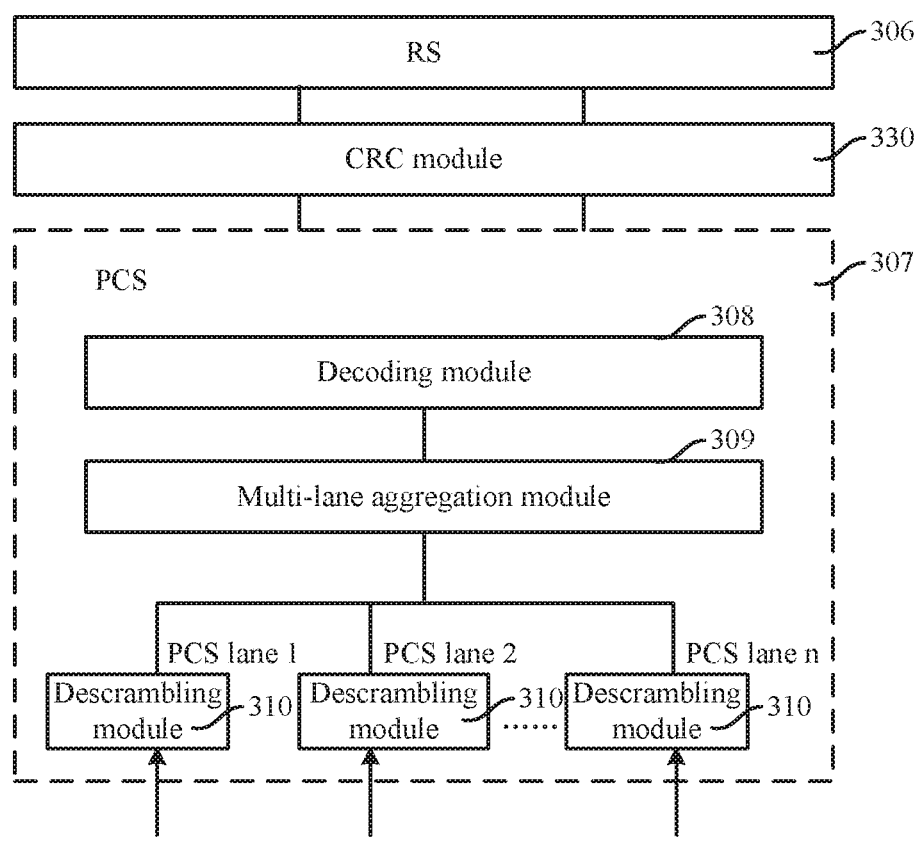
FIG. 9B is a schematic diagram of adding a CRC module based on FIG. 5B.

As shown in FIG. 9A and FIG. 9B, a CRC module 330 may be disposed between the RS and the PCS of the transmitter and between the RS and the PCS of the receiver. The CRC module 330 adds an FCS check sequence to a footer of a MAC frame sent by the RS 301. The FCS may include a CRC8 check sequence, a CRC16 check sequence, or the like. That is, an extra 8-bit or 16-bit frame check sequence FCS generated by the CRC8 check coding or the CRC16 check coding is added straight after the CRC32 frame check sequence FCS of the MAC frame.

Figure 10A:
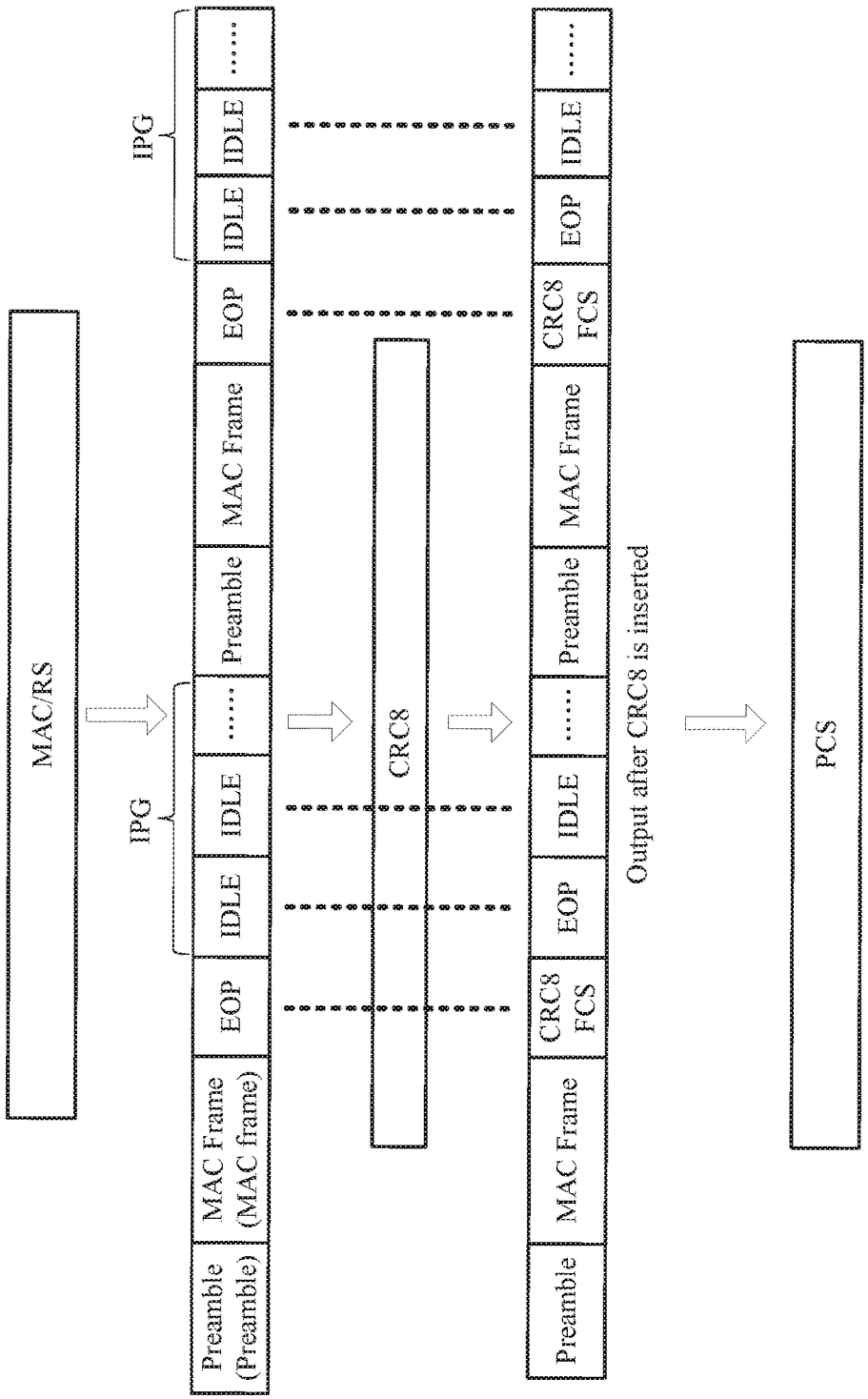
FIG. 10A is a schematic diagram of adding a CRC8 to a MAC frame according to an embodiment of the present invention.

During specific implementation, as shown in FIG. 10A, the CRC module 330 adds at least a 1-byte or 2-byte IDLE (idle) byte between two MAC frames in a data stream sent by the RS 301, to serve as an IPG (Inter packet gap, inter-packet gap), where the IPG acts as reserved space of the CRC8 check sequence. At the transmitter, the CRC module 330 adds the CRC8 check sequence before an end-of-packet sign EOP. That is, the end-of-packet sign EOP and the 1-byte or 2-byte IDLE in the IPG are replaced with the CRC8 check sequence and the EOP sign. At the receiver, after CRC8 packet check, the CRC module 330 restores the CRC8 check sequence and the EOP sign to the original end-of-packet sign EOP and the IDLE byte.

Figure 10B:
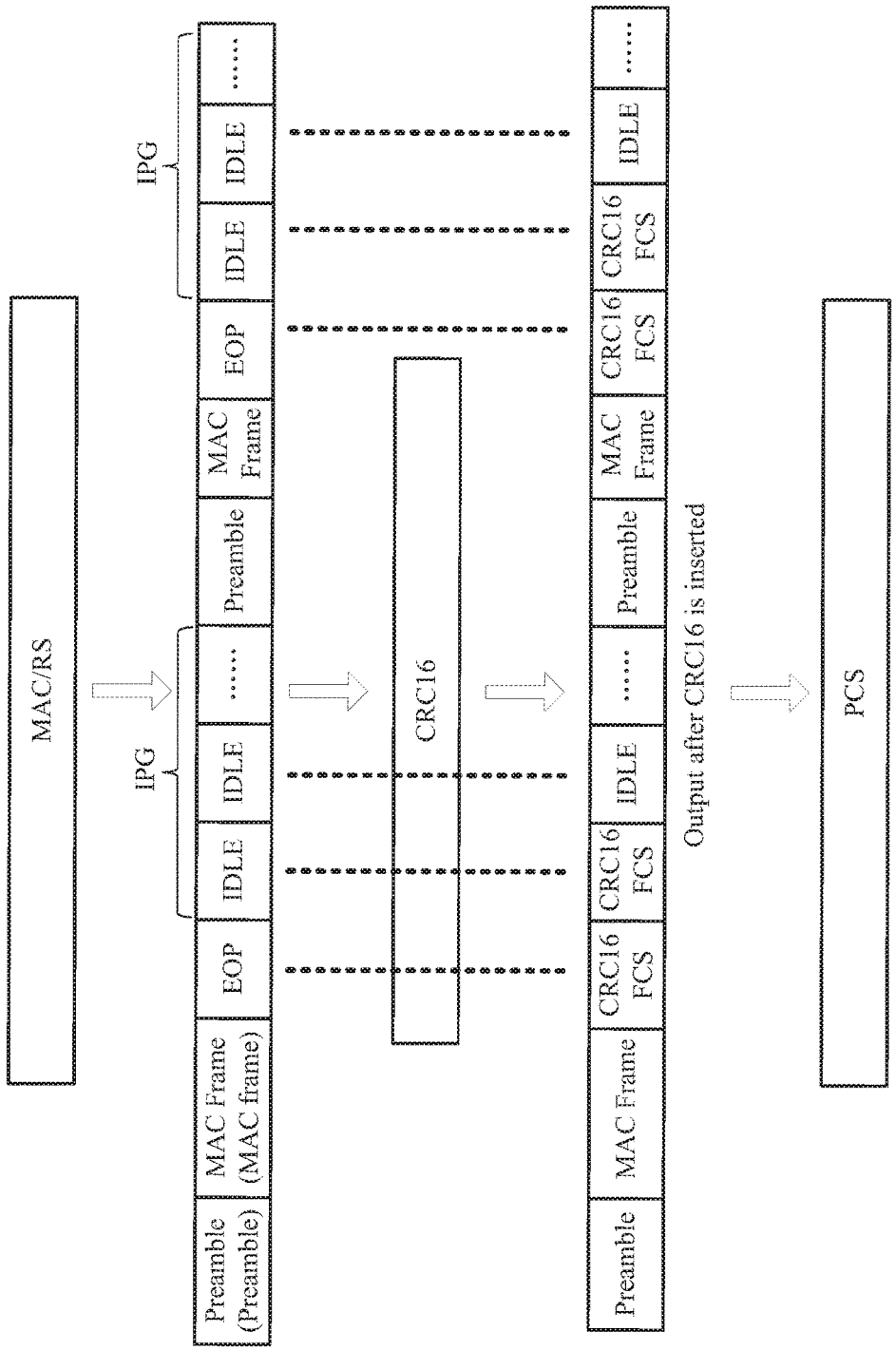
FIG. 10B is a schematic diagram of adding a CRC16 to a MAC frame according to an embodiment of the present invention.

The foregoing CRC8 check sequence may also be replaced with a CRC16 check sequence, and a schematic diagram of adding the CRC16 check sequence may be shown in FIG. 10B.

By means of twice checks, that is, the MAC sublayer CRC32 check and the CRC8 or CRC16 check of the extra CRC module disposed in this embodiment of the present invention, an error packet detection probability may be enhanced. By using the solution of adding the CRC16 check sequence, the MTTFPA may be enhanced to be close to reaching the performance lower limit of the existing Scramble on AL solution.

Optimization Solution 3: Combine CRC Check with FEC Check

The optimization solution 3 is a combination of the foregoing optimization solution 1 and the optimization solution 2. That is, an FCS check sequence (such as a CRC8 check sequence or CRC16 check sequence) is added between the PCS sublayer and the RS sublayer, and at the same time, the FEC check sequence is added to each PCS lane separately after the self-synchronizing scramble at the PCS sublayer. The solution may enable the MTTFPA to be higher than a conservative performance lower limit of the existing Scramble on AL solution.

After the FCS and/or FEC check processing operation is added, a physical layer scrambling process at a transmit end and a physical layer descrambling process at a receive end are basically consistent with the foregoing process. Using the combination of the CRC check and the FEC check as an example, a CRC module between the RS and the PCS at the transmit end adds a CRC8 or CRC16 check sequence to a footer of a sent MAC frame, and after scrambling modules in the PCS perform self-synchronizing scramble, an FEC module on each PCS lane adds an FEC check sequence to data on this PCS lane, an FEC module on each PCS lane in the PCS at a receive end physical layer performs FEC check for data on this PCS lane, a descrambling module on this PCS lane performs self-synchronizing descramble, and then an extra added CRC module and a CRC module at the MAC sublayer separately perform FCS check, to determine whether there is a packet loss.

It can be seen from the foregoing solutions of adding check processing that: in one aspect, in this embodiment of the present invention, self-synchronizing scramble and descramble processing processes are moved from before a multi-lane distribution processing operation to after the multi-lane distribution processing operation, and self-synchronizing scramble and descramble are performed separately for each PCS lane obtained by multi-lane distribution; in this way, because a bandwidth of each PCS lane is narrow, logic circuit designs for the scramble and descramble are reduced compared with those in the prior art, and therefore, costs in aspects such as a chip area, power consumption, and timing convergence can be reduced; and in another aspect, check processing is performed for data, an effect of error propagation on a MAC CRC32 error detection capability can be improved, and system MTTFPA performance is improved.

Embodiment 2

Embodiment 2 describes a specific implementation process of a Scramble on VL solution in a flexible Ethernet by using scramble/descramble of a beyond-100GE Ethernet as an example.

Figure 11:
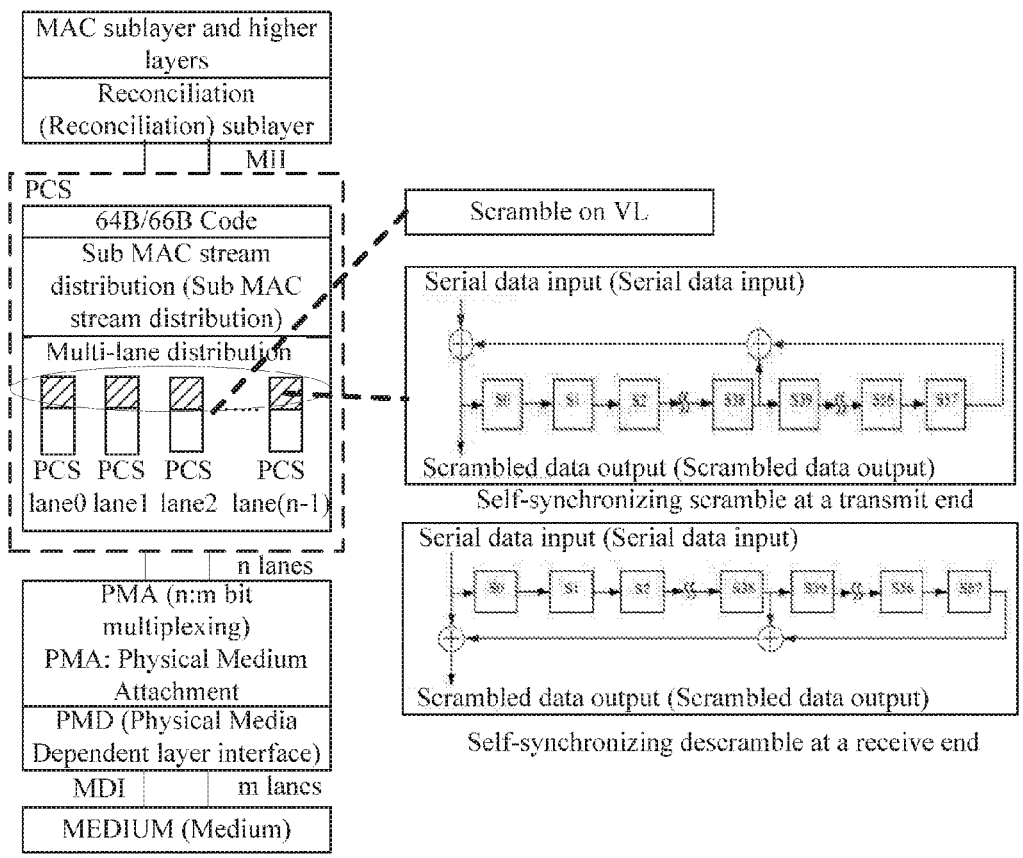
FIG. 11 is a block diagram of a Scramble on VL solution of a flexible Ethernet according to another embodiment of the present invention.

For the flexible Ethernet, a block diagram of an organization structure of the Scramble on VL solution provided by this embodiment of the present invention may be shown in FIG. 11.

The organization structure shown in FIG. 11 may be implemented in the following manner:

Before an RS at a MAC layer receives a packet stream, a packet processing unit distinguishes the packet stream into multiple sub MAC streams according to at least one field in an Ethernet frame in the packet stream or at least one field in an IP header in an Ethernet frame, and sets a label for a sub MAC stream corresponding to each Ethernet frame of the multiple sub MAC streams separately. After PCS sublayer 64B/66B coding is completed, a sub MAC stream distribution operation related to the flexible Ethernet is performed. The sub MAC stream distribution operation mainly includes: a PCS distinguishes the packet stream into multiple sub MAC streams according to a sub MAC stream label in each Ethernet frame; and then, implements a scrambling or descrambling operation separately on each PCS lane after data blocks are distributed to multiple PCS lanes by using multiple lanes. During specific implementation, an independent scrambling module and descrambling module may be disposed on each PCS lane, and each scrambling module and descrambling module perform self-synchronizing scramble and descramble processing only for data blocks on this PCS lane.

Figure 12A:
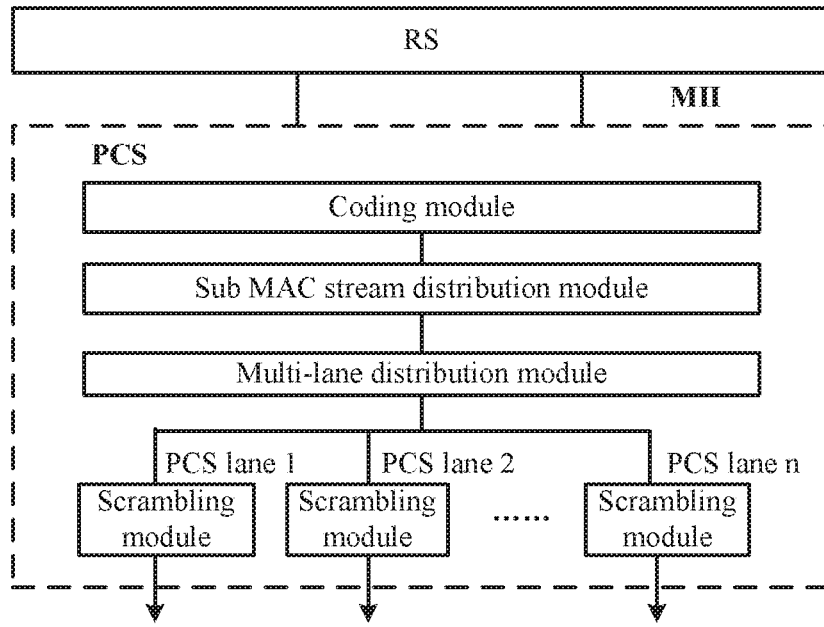
FIG. 12A is a schematic structural diagram of a transmitter according to another embodiment of the present invention.
Figure 12B:
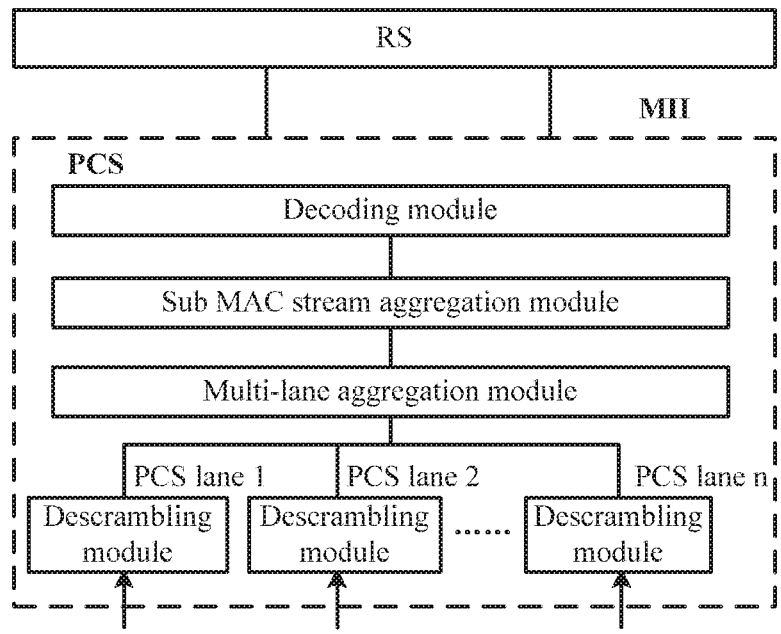
FIG. 12B is a schematic structural diagram of a receiver according to another embodiment of the present invention.

FIG. 12A shows a structure of a transmitter, and FIG. 12B shows a structure of a receiver. At the transmitter, a coding module performs physical layer coding processing for data output by an RS; a sub MAC stream distribution module performs sub MAC stream distribution processing for data coded by the coding module; a multi-lane distribution module performs multi-lane distribution processing separately for sub MAC streams obtained after the processing performed by the sub MAC stream distribution module; and a scrambling module performs self-synchronizing scramble for data on a corresponding PCS lane. At a receive end, a descrambling module performs self-synchronizing descramble for data of a corresponding PCS lane; a multi-lane aggregation module performs multi-lane aggregation for data of multiple PCS lanes after the self-synchronizing descramble performed by all descrambling modules; a sub MAC stream aggregation module performs sub MAC stream aggregation for multi-lane aggregated data after the multi-lane aggregation is performed for data, that undergoes the self-synchronizing descramble, of the multiple PCS lanes; and a decoding module decodes data processed by the sub MAC stream aggregation module.

Similar to Embodiment 1, a flexible Ethernet architecture based on the Scramble on VL solution also faces a problem that a structure of "MLD+Bit MUX" processing adversely affects system link performance. In order to improve link direct current balance (DC balance) performance and bit transition (bit transition) performance of a physical lane at an Ethernet electrical interface in the Scramble on VL solution, and finally improve bit error rate (Bit Error Rate, BER) performance of a system and working reliability and stability of a CDR circuit at the receive end, similar to Embodiment 1, in Embodiment 2, a value of a shift register in the scrambling module on each PCS lane at a transmit end may be further initialized separately, to ensure that the system works stably and reliably. Initialization solutions of the scrambling module are the same as those of Embodiment 1, and details are not described herein again.

Similar to Embodiment 1, a self-synchronizing scrambling operation has a characteristic of error propagation, and a 1-bit error may be propagated to a 3-bit error. In order to improve an effect of the error propagation on a MAC CRC32 error detection capability, and improve the system MTTFPA performance, similar to Embodiment 1, in Embodiment 2, a check sequence may also be added to improve the system MTTFPA performance. Optimization solutions of adding the check sequence are the same as those in Embodiment 1, and details are not described herein again.

It can be seen from the foregoing process of Embodiment 2 that, implementing the Scramble on VL solution in the flexible Ethernet may achieve a technical effect similar to Embodiment 1.

In addition, for a flexible grouping manner for various sub MAC stream interface bandwidths of the flexible Ethernet in the prior art, if a Scramble on AL method in a 40GE/100GE standard is still used, an implementation method thereof is necessarily a method of combining a scrambling module combination of several different bandwidths with various types of MUX (multiplexing). That is, it is necessary to provide a scrambling resource pool of multiple interface bandwidths for MUX to select flexibly, and occupied logical resources rise sharply with an increase in sub MAC stream bandwidth granularity supported by the flexible Ethernet and a flexible grouping number, resulting in a further significant increase in aspects such as area, power consumption, and timing convergence. Further, the implementation solution of a scrambling module resource pool of multiple interface bandwidths+a MUX selecting module has poor extensibility and reusability, and a logical structure is not simple and flexible enough. Similarly, a descrambling solution in the prior art also has a similar problem. In the foregoing Embodiment 2, scramble and descramble are performed separately for each PCS lane, so that it is unnecessary to set a scrambling and descrambling resource pool of multiple interface bandwidths for the MUX to select flexibly, and it is only necessary to implement a certain number (which is equal to a quantity of PCS lanes) of minimum bandwidth parallel scramblers, which are only a very small subset of a required scrambling resource pool before multi-lane distribution. Therefore, compared with the prior art, costs in aspects such as a chip area, power consumption, and timing convergence are further reduced, extensibility and reusability of a timing solution are improved, and the logical structure is simple and flexible.

Based on the same technical idea, this embodiment of the present invention further provides an apparatus capable of implementing the physical layer processing method shown in FIG. 2A, and the apparatus may be one of the following apparatuses:

a PHY, where the PHY may be implemented by using an FPGA or an ASIC; the PHY may be a part in an NIC, and the NIC may be a line card or a PIC; and the PHY may include an MII for interfacing to a MAC:

a PHY chip, where the PHY chip may include multiple PHYs, and the PHY chip may be implemented by using an FPGA or an ASIC;

a system chip, where the system chip may include multiple MACs and multiple PHYs, and the system chip may be implemented by using an FPGA or an ASIC; and a multiport Ethernet device, which may be an Ethernet hub, an Ethernet router, or an Ethernet switch. The multiport Ethernet device includes multiple ports, each port may include a system chip, and the system chip may include MACs and PHYs. The multiport Ethernet device may further integrate multiple MACs into one MAC chip (MAC chip), and integrate multiple PHYs into one PHY chip. The multiport Ethernet device may also integrate multiple MACs and multiple PHYs into one system chip.

The apparatus can execute the physical layer processing method including a scrambling process provided by the foregoing embodiments of the present invention, and a specific implementation manner is not described herein again.

Based on the same technical idea, this embodiment of the present invention further provides an apparatus capable of implementing the physical layer processing method shown in FIG. 2B, and the apparatus may be one of the following apparatuses:

a PHY, where the PHY may be implemented by using an FPGA or an ASIC; the PHY may be a part in an NIC, and the NIC may be a line card or a PIC; and the PHY may include an MII for interfacing to a MAC:

a PHY chip, where the PHY chip may include multiple PHYs, and the PHY chip may be implemented by using an FPGA or an ASIC;

a system chip, where the system chip may include multiple MACs and multiple PHYs, and the system chip may be implemented by using an FPGA or an ASIC; and a multiport Ethernet device, which may be an Ethernet hub, an Ethernet router, or an Ethernet switch. The multiport Ethernet device includes multiple ports, each port may include a system chip, and the system chip may include MACs and PHYs. The multiport Ethernet device may further integrate multiple MACs into one MAC chip, and integrate multiple PHYs into one PHY chip. The multiport Ethernet device may also integrate multiple MACs and multiple PHYs into one system chip.

The apparatus can execute the physical layer processing method including a descrambling process provided by the foregoing embodiments of the present invention, and a specific implementation manner is not described herein again.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division may merely be logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a non-transitory computer readable storage medium (non-transitory computer readable storage medium). Based on such an understanding, the technical solutions of the present invention essentially, or the part contributing to the prior art, or a part of the technical solutions may be implemented in a form of a computer program. The computer program is stored in a storage medium for instructing a computer device (which may be a personal computer, a server, or a network device) to perform all or a part of the steps of the methods described in the embodiments of the present invention. Specifically, the computer device includes a processor. The processor may access the computer program in the storage medium, so as to execute all or a part of the steps of the methods described in the embodiments of the present invention. The foregoing processor may be a central processing unit (central processing unit, CPU), a network processor (network processor), or an FPGA. The foregoing storage medium may be: a USB flash drive, a removable hard disk, a read-only memory (Read-Only Memory, ROM), a random access memory (Random Access Memory, RAM), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for processing data, comprising:
 coding, by a circuit, received data;
 distributing, by the circuit, the coded data to multiple physical coding sublayer (PCS) lanes to acquire multiple data streams, wherein the multiple data streams are in a one-to-one correspondence with the multiple PCS lanes;
 separately initializing values of multiple shift registers in multiple circuits, wherein the multiple circuits are in a one-to-one correspondence with the multiple shift registers, and an absolute value of a correlation coefficient among the initialized values of the multiple shift registers is greater than or equal to zero and smaller than 1; and
 performing, by the multiple circuits, self-synchronizing scramble separately for the multiple data streams, wherein the multiple circuits are in a one-to-one correspondence with the multiple PCS lanes.

2. The method according to claim 1, wherein the separately initializing values of multiple shift registers in the multiple circuits comprises:
 acquiring an N*M-bit PRBS sequence generated by a pseudo-random binary sequence PRBS generator;
 dividing the N*M-bit PRBS sequence into N M-bit PRBS sequences; and
 separately assigning the N M-bit PRBS sequences to N shift registers initially, the N shift registers being the multiple shift registers,
 wherein a quantity of the multiple PCS lanes is N, and M is an order of a scramble generator polynomial.

3. A transmitter, comprising:
 a physical coding sublayer (PCS), wherein the PCS comprises: a circuit, wherein the circuit is configured to:
 code received data;
 distribute the coded data to multiple PCS lanes to acquire multiple data streams; and
 perform self-synchronizing scramble separately for the multiple data streams, wherein the multiple data streams are in a one-to-one correspondence with the multiple PCS lanes, wherein the circuit is further configured to:
separately initialize values of multiple shift registers, and an absolute value of a correlation coefficient among the initialized values of the multiple shift registers is greater than or equal to zero and smaller than 1.

4. The transmitter according to claim 3, wherein the circuit is configured to: acquire an N*M-bit PRBS sequence generated by a pseudo-random binary sequence PRBS generator, divide the N*M-bit PRBS sequence into N M-bit PRBS sequences, and separately assign the N M-bit PRBS sequences to N shift registers initially, the N shift registers being the multiple shift registers, wherein a quantity of the multiple PCS lanes is N, and M is an order of a scramble generator polynomial.

* * * * *

UNITED STATES PATENT AND TRADEMARK OFFICE
CERTIFICATE OF CORRECTION

PATENT NO. : 9,942,064 B2
APPLICATION NO. : 15/062479
DATED : April 10, 2018
INVENTOR(S) : Zhijun Li, Zhiqiang Chen and Dajun Zang Page 1 of 1

It is certified that error appears in the above-identified patent and that said Letters Patent is hereby corrected as shown below:

On the Title Page

(73) Assignee: delete "HUAWEI TECHNOLOGIES CO., LTD., Shenzhen (CH)" and insert
--HUAWEI TECHNOLOGIES CO., LTD., Shenzhen (CN)--.

Signed and Sealed this
Twenty-sixth Day of June, 2018

Andrei Iancu
*Director of the United States Patent and Trademark Office*